United States Patent [19]

Demura

[11] Patent Number: 5,228,286
[45] Date of Patent: Jul. 20, 1993

[54] AIR-FUEL RATIO CONTROL DEVICE OF ENGINE

[75] Inventor: Takayuki Demura, Mishima, Japan

[73] Assignee: Toyota Jidosha Kabushiki Kaisha, Aichi, Japan

[21] Appl. No.: 882,876

[22] Filed: May 14, 1992

[30] Foreign Application Priority Data

May 17, 1991 [JP] Japan .................................. 3-113141

[51] Int. Cl.⁵ .................................. F01N 3/20
[52] U.S. Cl. ...................................... 60/276; 60/277; 60/285; 123/682; 123/691
[58] Field of Search .................. 60/276, 277, 285; 123/691, 682

[56] References Cited

U.S. PATENT DOCUMENTS

| | | |
|---|---|---|
| 3,939,654 | 2/1976 | Creps . |
| 4,027,477 | 6/1977 | Storey . |
| 4,089,313 | 5/1978 | Asano et al. . |
| 4,111,162 | 9/1978 | Norimatsu et al. . |
| 4,127,088 | 11/1978 | Ezoe . |
| 4,130,095 | 12/1978 | Bowler et al. . |
| 4,177,787 | 12/1979 | Hattori et al. . |
| 4,178,884 | 12/1979 | Norimatsu et al. . |
| 4,186,691 | 2/1980 | Takase et al. . |
| 4,235,204 | 11/1980 | Rice . |
| 4,244,340 | 1/1981 | Herth et al. . |
| 4,251,989 | 2/1981 | Norimatsu et al. . |
| 4,401,086 | 8/1983 | Miyagi . |
| 4,462,373 | 7/1984 | Kanno . |
| 4,475,517 | 10/1984 | Kobayashi et al. . |
| 4,502,443 | 3/1985 | Hasegawa et al. . |
| 4,539,958 | 9/1985 | Ito et al. . |
| 4,561,400 | 12/1985 | Hattori . |
| 4,571,683 | 2/1986 | Kobayashi et al. . |
| 4,693,076 | 9/1987 | Chujo et al. . |
| 4,697,567 | 10/1987 | Sawada et al. . |
| 4,707,985 | 11/1987 | Nagai et al. . |
| 4,712,373 | 12/1987 | Nagai et al. . |
| 4,720,973 | 1/1988 | Katsuno . |
| 4,723,521 | 2/1988 | Mieno .................. 123/691 |
| 4,739,614 | 4/1988 | Katsuno et al. . |
| 4,760,822 | 8/1988 | Mieno .................. 123/682 |
| 4,881,368 | 11/1989 | Demura et al. . |
| 4,941,138 | 12/1991 | Norimatsu et al. . |
| 4,964,271 | 10/1990 | Sawada et al. . |
| 4,964,272 | 10/1990 | Kayanuma .............. 60/276 |
| 5,022,225 | 6/1991 | Sawada et al. . |
| 5,074,113 | 12/1991 | Matsuoka . |

FOREIGN PATENT DOCUMENTS

| | | |
|---|---|---|
| 63-97852 | 4/1988 | Japan . |
| 63-147941 | 6/1988 | Japan . |
| 1-203633 | 8/1988 | Japan . |
| 64-24138 | 1/1989 | Japan . |
| 64-36942 | 2/1989 | Japan . |
| 64-36943 | 2/1989 | Japan . |
| 1-190936 | 8/1989 | Japan . |
| 1-211634 | 8/1989 | Japan . |
| 1-257738 | 10/1989 | Japan . |
| 2-30915 | 2/1990 | Japan . |
| 2-33408 | 2/1990 | Japan . |
| 2-37144 | 2/1990 | Japan . |
| 3-57862 | 3/1991 | Japan . |

*Primary Examiner*—Douglas Hart
*Attorney, Agent, or Firm*—Oliff & Berridge

[57] ABSTRACT

An air-fuel ratio control device including an $O_2$ sensor arranged in the exhaust passage downstream of a three-way catalyst. In the lean air-fuel ratio operating state such as at a fuel cut, when a large amount of oxygen is introduced to the three-way catalyst, air-fuel ratio feedback control by the $O_2$ sensor output is stopped. Next, after the end of the lean air-fuel ratio operating state, the resumption of the air-fuel ratio feedback control by the $O_2$ sensor output is delayed for a predetermined time T and, during the delay period, the air-fuel ratio upstream of the catalyst is made rich.

19 Claims, 15 Drawing Sheets

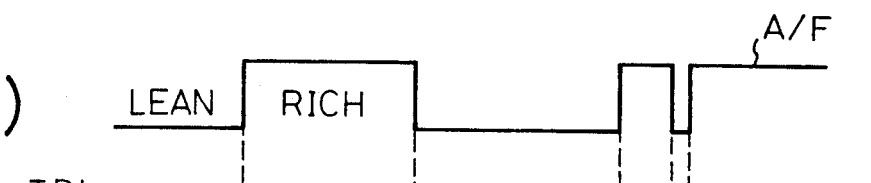
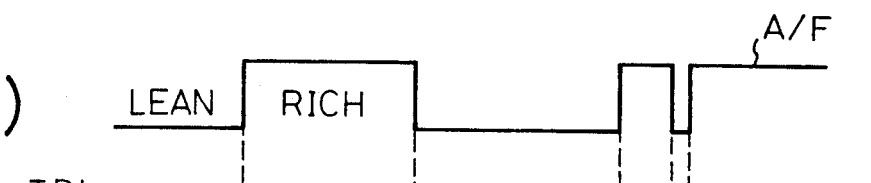
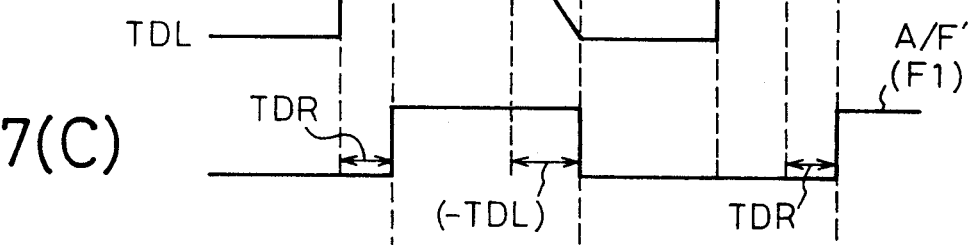
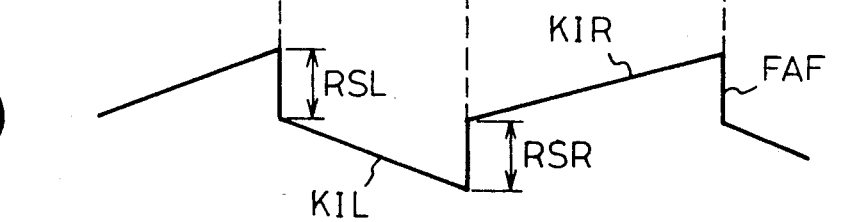

AIR-FUEL RATIO CONTROL DEVICE OF ENGINE

BACKGROUND OF THE INVENTION

1. Field of the Invention

The present invention relates to an air-fuel ratio control device of an engine.

2. Description of the Related Art

In the past, to obtain better exhaust emission of internal combustion engines, wide use has been made of the system wherein an air-fuel ratio sensor, for example, an $O_2$ sensor, is arranged upstream of a three-way catalyst provided in the exhaust system and feedback is given in accordance with the output of the $O_2$ sensor so that the air-fuel ratio becomes the stoichiometric air-fuel ratio. In such a system, the $O_2$ sensor is arranged at the convergence portion of the exhaust manifold upstream of the catalyst. Since the $O_2$ sensor is in the exhaust system near to the combustion chambers, however, (1) the characteristics of the output change along with time due to the heat of the exhaust, the lead in the fuel, etc. and precise detection of the air-fuel ratio of the engine became impossible and (2) since an $O_2$ sensor is very susceptible to the effects of the air-fuel ratio of any specific cylinder, when the characteristics of the fuel injection valves etc. provided in the cylinders vary or change, it sometimes becomes impossible to suitably detect the air-fuel ratio of the engine as a whole.

Therefore, in the above-mentioned system, the air-fuel ratio sometimes could not be suitably controlled. As a way to solve this, a system has been proposed wherein an $O_2$ sensor is arranged only downstream of the catalyst or also downstream of the catalyst and the air-fuel ratio is subjected to feedback control using the output of that downstream $O_2$ sensor as well (see Japanese Unexamined Patent Publication No. 1-203633). The $O_2$ sensor downstream of the catalyst in this system has a higher precision of detection of the air-fuel ratio of the engine and therefore an extremely good precision of control of the air-fuel ratio of the system due to the facts that (1) there are less changes in characteristics due to heat since the exhaust heat downstream of the catalyst is lower than the exhaust heat just after the combustion chambers as the distance from the combustion chambers to the catalyst is longer, (2) there are less changes in characteristics due to toxication since various toxic substances in the fuel are trapped by the catalyst, and (3) the gas in the cylinders is sufficiently mixed in the catalyst and there is little effect of any specific cylinder.

However, since a three-way catalyst has an $O_2$ storage function, i.e., absorbs and holds oxygen during lean air-fuel ratio operation when there is a large amount of oxygen in the exhaust gas and discharges the absorbed and held oxygen during rich air-fuel ratio operation, even in this system there are cases where the precision of control of the air-fuel ratio falls under specific operating conditions. That is, in this system, during a fuel cut or a lean air-fuel ratio operation such as when secondary air is introduced into the exhaust system upstream of the catalyst, where the air-fuel ratio upstream of the catalyst continues to be leaner than the stoichiometric air-fuel ratio, feedback control by the output of the $O_2$ sensor downstream of the catalyst is stopped and at that time a large amount of oxygen is absorbed and held in the catalyst. Next, immediately after the lean air-fuel ratio operation ends, feedback control by the output of the $O_2$ sensor downstream of the catalyst is started.

The $O_2$ sensor, however, judges that there is too much oxygen in the exhaust gas and judges that the engine is in a lean operating state when there are oxygen molecules at the sensor detection portion and judges that the engine is in a rich operating state when the oxygen molecules at the sensor detection portion bond with the unburnt component in the exhaust gas and disappear.

If, however, a large amount of oxygen is absorbed and held in the catalyst as mentioned above, even when the air-fuel ratio becomes rich after the lean air-fuel ratio operation has ended, the unburnt components in the exhaust gas will bond with the oxygen absorbed and held in the catalyst and will disappear in the catalyst. As a result, the oxygen molecules adhering to the sensor detection portion of the $O_2$ sensor during a lean air-fuel ratio operation will continue to adhere to the sensor detection portion as they are without bonding with the unburnt components and therefore even if the air-fuel ratio becomes rich, the $O_2$ sensor will judge that the engine is in the lean operating state. As a result, the air-fuel ratio will be feedback controlled so as to become further richer and thus the exhaust emission will deteriorate.

In this way, if a large amount of oxygen is absorbed and held in the catalyst, due to the effects of the absorbed and held oxygen, the $O_2$ sensor will judge that the air-fuel ratio is lean not only when the air-fuel ratio is lean, of course, but also when the air-fuel ratio is rich. In actuality, however, a rich operating state and a lean operating state repeat after a continuous lean operating state ends due to a fuel cut or supply of secondary air, so the oxygen absorbed and held in the catalyst gradually dissipates during this period and once a certain time has elapsed after the end of a continuous lean operating state, the $O_2$ sensor will detect the accurate air-fuel ratio without being affected by the oxygen absorbed and held at the catalyst. Therefore, to prevent the air-fuel ratio from tremendously deviating from the stoichiometric air-fuel ratio, it is sufficient to restart the feedback control by the $O_2$ sensor after a certain time after a continuous lean operating state has ended.

The amount of oxygen, however, absorbed and held at a catalyst depends on the extent of deterioration of the catalyst. The more deteriorated the catalyst, the smaller the amount of oxygen absorbed and held in the catalyst. If the amount of oxygen absorbed and held at the catalyst becomes smaller, then time until which the $O_2$ sensor can detect the correct air-fuel ratio after the continuous lean operating state ends becomes shorter, so the elapsed time depends on the extent of deterioration of the catalyst. Therefore, there is known a system in which the resumption of the feedback control based on the output of the $O_2$ sensor after the end of a continuous lean operating state is delayed and the delay time is changed in accordance with the extent of deterioration of the three-way catalyst (see Japanese Unexamined Patent Publication (Kokai) No. 1-203633). In this system, while the resumption of the feedback control based on the output of the $O_2$ sensor is delayed, the amount of correction of the air-fuel ratio is held to the amount of correction of the air-fuel ratio just before the continuous lean operating state.

When holding the amount of correction of the air-fuel ratio to the amount of correction of the air-fuel ratio just before the continuous lean operating state while the resumption of the feedback control by the output of the $O_2$ sensor is delayed in this way, the delay time of the resumption of the feedback control based on the output of the O₂ sensor becomes longer and therefore the time of deterioration of the exhaust emission becomes longer since time is needed until the resumption of the feedback.

SUMMARY OF THE INVENTION

An object of the present invention is to provide an air-fuel ratio control device which can shorten the time during which the exhaust emission deteriorates by having the O₂ sensor be able to detect the accurate air-fuel ratio as quickly as possible after the end of a continuous lean operating state.

According to the present invention, there is provided an air-fuel ratio control device of an engine having an exhaust passage which has a three-way catalyst therein, the device comprising air-fuel ratio detecting means arranged in the exhaust pipe to detect an air-fuel ratio; calculating means for calculating an amount of correction of the air-fuel ratio, which amount is necessary to equalize an air-fuel ratio of a mixture fed into the engine to the stoichiometric air-fuel ratio, on the basis of an output of the air-fuel ratio detecting means; control means for controlling an amount of fuel fed into the engine on the basis of the amount of correction of air-fuel ratio to equalize the air-fuel ratio of mixture to the stoichiometric air-fuel ratio in a predetermined first engine operating state; a first air-fuel ratio adjusting means for stopping the control of the amount of fuel by the control means to maintain the air-fuel ratio of mixture at a lean side air-fuel ratio during a predetermined second engine operating state; and a second air-fuel ratio adjusting means for stopping the control of the amount of fuel by the control means to maintain the air-fuel ratio of mixture at a rich side air-fuel ratio during a predetermined time after the engine operating state is changed from the second engine operating state to the first engine operating state.

The present invention may be more fully understood from the description of preferred embodiments of the invention set forth below, together with the accompanying drawings:

BRIEF DESCRIPTION OF THE DRAWINGS

In the drawings,

FIG. 7 is a timing chart for supplementarily explaining the flow chart of FIG. 6 and FIG. 7;

DESCRIPTION OF THE PREFERRED EMBODIMENTS

Below, an explanation will be made of the present invention based on a system (double O₂ sensor system) where use is made of O₂ sensors for detection of the concentration of oxygen as air-fuel ratio sensors and provision is made of an O₂ sensor upstream of the catalyst in addition to an O₂ sensor provided downstream of the catalyst, but the present invention may also be applied to a system wherein an O₂ sensor is arranged only downstream of the catalyst and feedback control is performed on the air-fuel ratio based on the output of the O₂ sensor.

Figure 1:
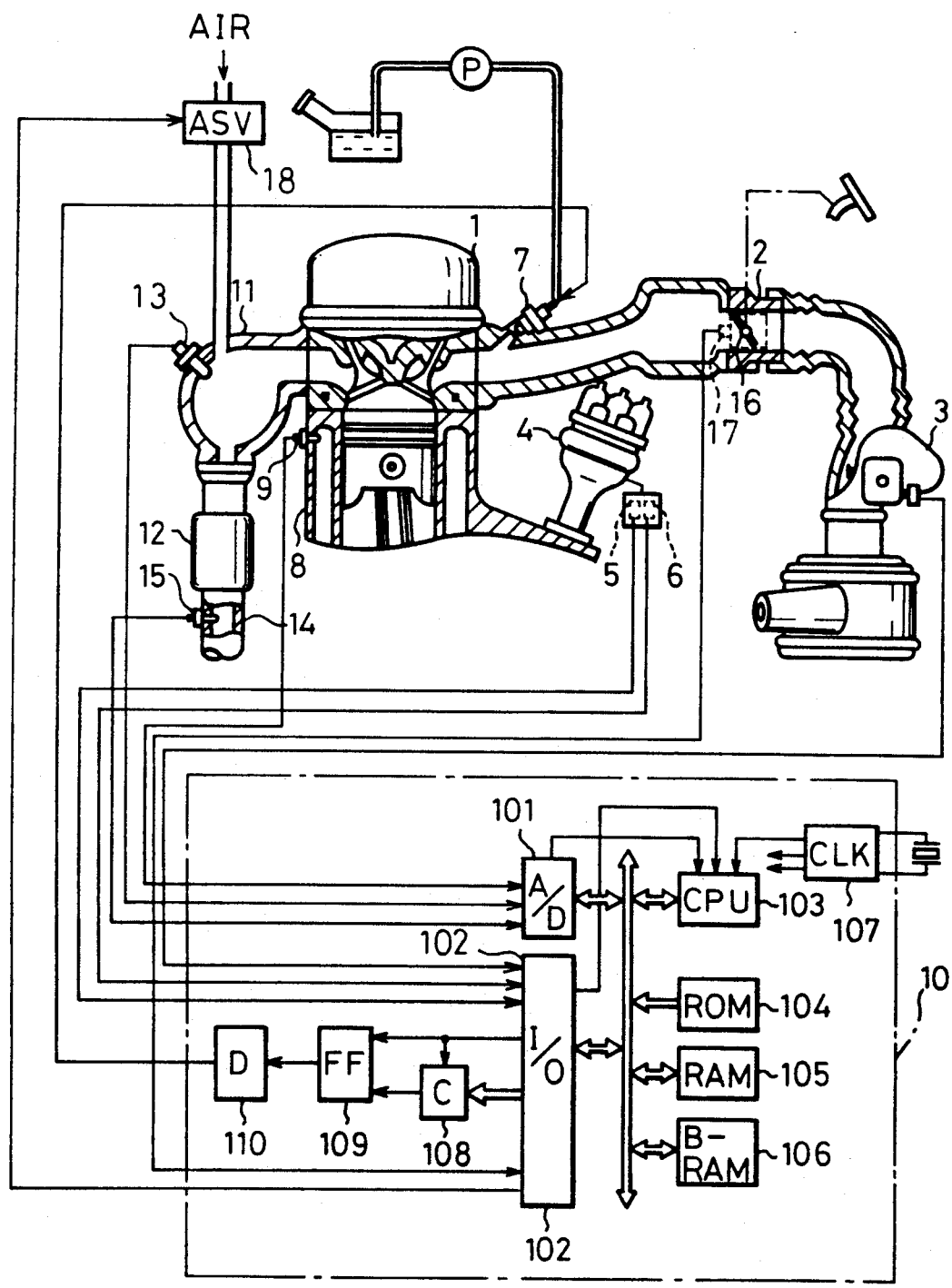
FIG. 1 is an overall schematic view of an embodiment of an air-fuel ratio control device of an internal combustion engine according to the present invention.

FIG. 1 is an overall schematic view showing an embodiment of the air-fuel ratio control device of an internal combustion engine according to the present invention. In FIG. 1, an air flow meter 3 is provided in an intake passage 2 of the engine body 1. The air flow meter 3 directly measures the amount of intake air, incorporates, for example, a potentiometer, and generates an output signal of an analog voltage proportional to the amount of the intake air. This output signal is provided to a multiplexer-built-in A/D converter 101 of a control circuit 10. A distributor 4 is provided with a crank angle sensor 5 which converts to a crank angle and generates a reference position detection pulse signal every 720° and a crank angle sensor 6 which converts to a crank angle and generates a reference position detection pulse signal every 30°. The pulse signals of the crank angle sensors 5 and 6 are supplied to an input-output interface 102 of the control circuit 10. Of these, the output of the crank angle sensor 6 is supplied to the interruption terminal of a CPU 103.

A fuel injector 7 for supplying pressurized fuel from a fuel supply system to each cylinder is provided in the intake passage 2.

Further, a water jacket 8 of the cylinder block of the engine body 1 is provided with a water temperature sensor 9 for detecting the temperature of the coolant water. The water temperature sensor 9 generates an electric signal of an analog voltage in accordance with the temperature THW of the coolant water. This output is also supplied to the A/D converter 101.

The exhaust system downstream from the exhaust pipe 11 is provided with a catalytic converter 12 housing a three-way catalyst for simultaneously purifying three toxic components HC, CO, and NOx in the exhaust gas.

The exhaust pipe 11, that is, the side upstream from the catalytic converter 12, is provided with a first O₂ sensor 13, while the exhaust pipe 14 on the downstream side of the catalytic converter 12 is provided with a second O₂ sensor 15. The O₂ sensors 13 and 15 generate electrical signals in accordance with the concentration of the oxygen component in the exhaust gas. That is, the O₂ sensors 13 and 15 generate output voltages differing in accordance with if the air-fuel ratio is on the lean side or rich side with respect to the stoichiometric air-fuel ratio to the A/D converter 101 of the control circuit 10.

The control circuit 10 is comprised of, for example, a microcomputer. In addition to the A/D converter 101, the input-output interface 102, and the CPU 103, a ROM 104, RAM 105, backup RAM 106, clock generating circuit 107, etc. are provided.

Further, the throttle valve 16 of the intake passage 2 is provided with an idle switch 17 for generating a signal LL showing if the throttle valve 16 is at the idling position or not. This idle state detection signal LL is supplied to the input-output interface 102 of the control circuit 10.

Reference numeral 18 is a secondary air introduction intake valve, which switches to connect or disconnect the atmosphere and exhaust pipe 11 by a control signal from the input-output interface 102 of the control circuit 10 and supply to the exhaust pipe 11 secondary air during deceleration or idling and therefore reduce the HC and CO emission.

In the control circuit 10, a down counter 108, a flip-flop 109, and a drive circuit 110 control the fuel injectors 7. That is, in the later mentioned routine, when the fuel injection amount TAU is computed, the fuel injection amount TAU is preset in the down counter 108 and is set in the flip-flop 109 as well. As a result, the drive circuit 110 starts biasing the fuel injectors 7. On the other hand, when the down counter 108 counts the clock signal (not shown) and finally the borrow out terminal reaches the "1" level, the flip-flop 109 is reset and the drive circuit 110 stops the biasing of the fuel injectors 7. That is, the fuel injectors 7 are biased by exactly the above-mentioned fuel injection amounts TAU and therefore the amount of fuel corresponding to the fuel injection amount TAU is sent into the combustion chambers of the engine body 1.

Note that the CPU 103 is interrupted after the end of A/D conversion by the A/D converter 101, when the input-output interface 102 receives a pulse signal of the crank angle sensor 6, etc.

The intake air data Q of the air flow meter 3 and the coolant water temperature data THW are fetched by an A/D conversion routine executed with every predetermined time or predetermined crank angle and are stored in a predetermined region of the RAM 105. That is, the data Q and the THW in the RAM 105 are updated with every predetermined time. Further, the rotational speed data N is computed by interruption every 30°CA of the crank angle sensor 6 and stored in a predetermined region of the RAM 105.

Figure 2:
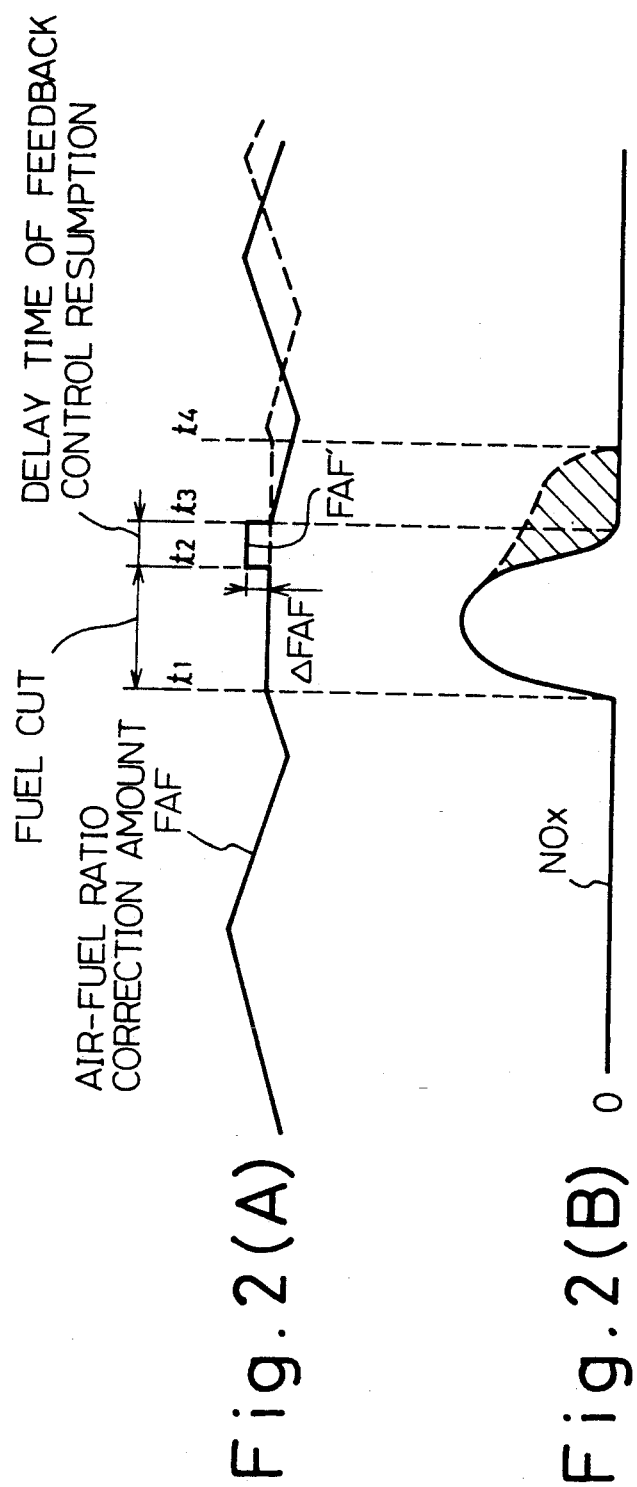
FIG. 2 is a time chart showing the basic method of thinking in the present invention.

Next, to enable easy understanding of the present invention, an explanation will be made of the basic thinking in the present invention referring to FIG. 2. Note that in FIG. 2, the solid lines show the air-fuel ratio correction amount FAF and the amount of generation of NOx according to the present invention, while the broken lines show the air-fuel ratio correction amount FAF and amount of generation of NOx according to the system disclosed in the abovementioned Japanese Unexamined Patent Publication (Kokai) No. 1-203633.

In the embodiment of the present invention, before the time $t_1$, as shown in FIG. 2(A), stoichiometric air-fuel ratio control is performed using the air-fuel ratio correction amount FAF and as a result, as shown in FIG. 2(B), the amount of NOx emission is small.

At the time $t_1$, when the engine enters a continuous lean operating state, for example, when the fuel is cut, as shown in FIG. 2(A), the air-fuel ratio correction amount FAF at that time is stored. In the continuous lean operating state ($t_1$ to $t_2$), the stoichiometric air-fuel ratio control is stopped and lean air-fuel ratio control is performed. As a result, as shown in FIG. 2(B), the amount of NOx emission increases.

Even in the period after the continuous lean operating state ($t_2$ to $t_3$), as shown in FIG. 2(A), the stoichiometric air-fuel ratio control is stopped. At that time, based on the air-fuel ratio correction amount stored at the time $t_1$, correction is made to the rich side by exactly the portion ΔFAF corresponding to the degree of deterioration of the three-way catalyst. Based on the resultant rich side air-fuel ratio correction amount FAF', rich side air-fuel ratio control is performed. Therefore, the amount of oxygen which had been absorbed and held in the three-way catalyst is rapidly decreased and, as shown in FIG. 2(B), the amount of NOx generation rapidly decreases. Next, at the time $t_3$, stoichiometric air-fuel ratio value the air-fuel ratio correction amount stored at the time $t_1$.

Note that in the system described in Japanese Unexamined Patent Publication (Kokai) No. 2-203633, as shown by the broken lines in FIG. 2(A), even after the elapse of the time $t_2$, the air-fuel ratio correction amount FAF is held to the air-fuel ratio correction amount FAF just before the start of the fuel cut. In this case, since the oxygen absorbed and held in the three-way catalyst does not rapidly decrease, the resumption of the feedback control is delayed to the time $t_4$. Therefore, the time after the continuous lean operating state ends to the resumption of the feedback control ($t_2$ to $t_4$) becomes longer and therefore the amount of generation of NOx increases by exactly the amount shown by the hatching of FIG. 2(B). Below, an explanation will be made of the operation of the control circuit of FIG. 1.

Figure 3:
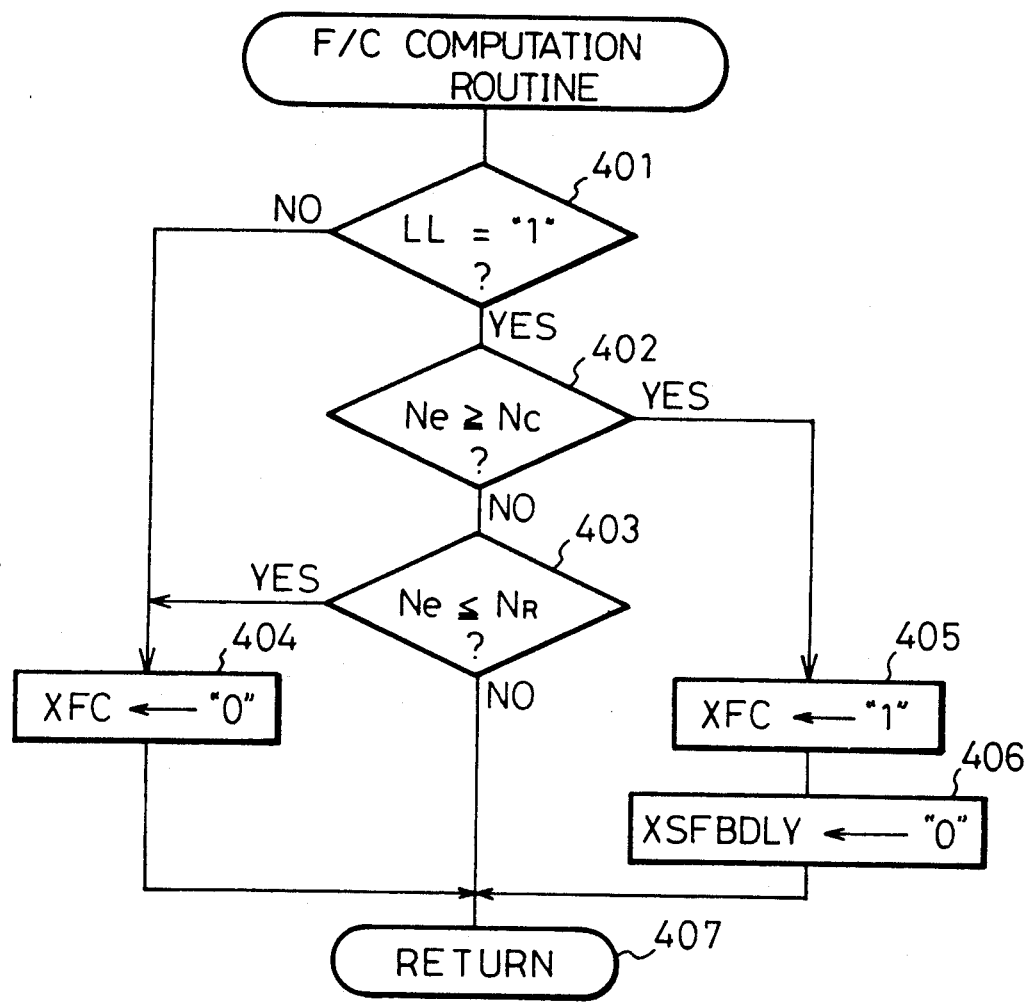
FIG. 3 is a flow chart for explaining the operation of the control circuit of FIG. 1.
Figure 4:
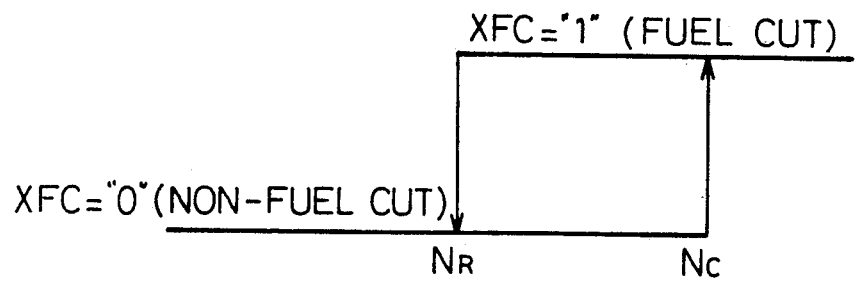
FIG. 4 is a timing chart for supplementarily explaining the flow chart of FIG. 3.

FIG. 3 shows the fuel cut processing routine which is executed at every predetermined time, for example, 4 ms. This routine is for setting the fuel cut flag XFC as shown in FIG. 4. Note that in FIG. 4, $N_C$ indicates the fuel cut rotational speed and $N_R$ the fuel cut recovery rotational speed, both of which are updated by the coolant water temperature THW of the engine.

At step 401, it is judged if the output signal LL of the idle switch 17 is "1" or not, that is, if the state is the idle state. If not the idle state, the routine proceeds to step 404, while if the idle state it proceeds to step 402. At step 402, the rotational speed $N_e$ is read out from the RAM 105 and compared with the fuel cut rotational speed $N_C$. At step 403, it is compared with the fuel cut recovery rotational speed $N_R$. As a result when $N_e \leq N_R$, at step 404 the fuel cut flag XFC is made "0", while when $N_e \geq N_C$, the routine proceeds to step 405, where the fuel cut flag XFC is made "1" and at step 406 a delay flag XSFBDLY is reset so as to delay the resumption of the air-fuel ratio feedback control by the downstream side O₂ sensor 15 used in the later mentioned routines of FIG. 8 and FIG. 9. On the other hand, when $N_R < N_e < N_C$, the flag XFC is held at the previous state. Next, the routine ends at step 407.

Figure 5:
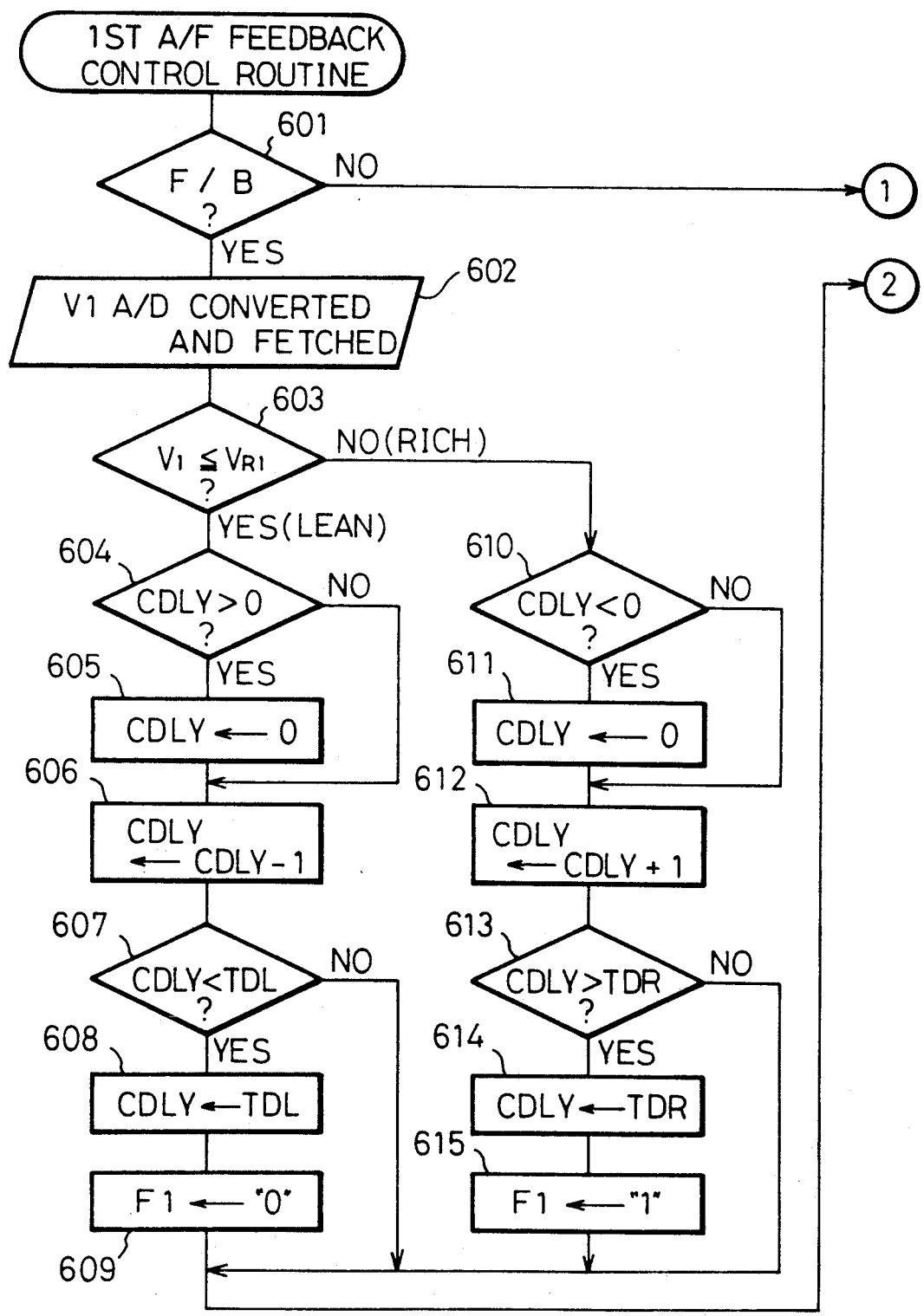
FIG. 5 is a flow chart for explaining the operation of the control circuit of FIG. 1.
Figure 6:
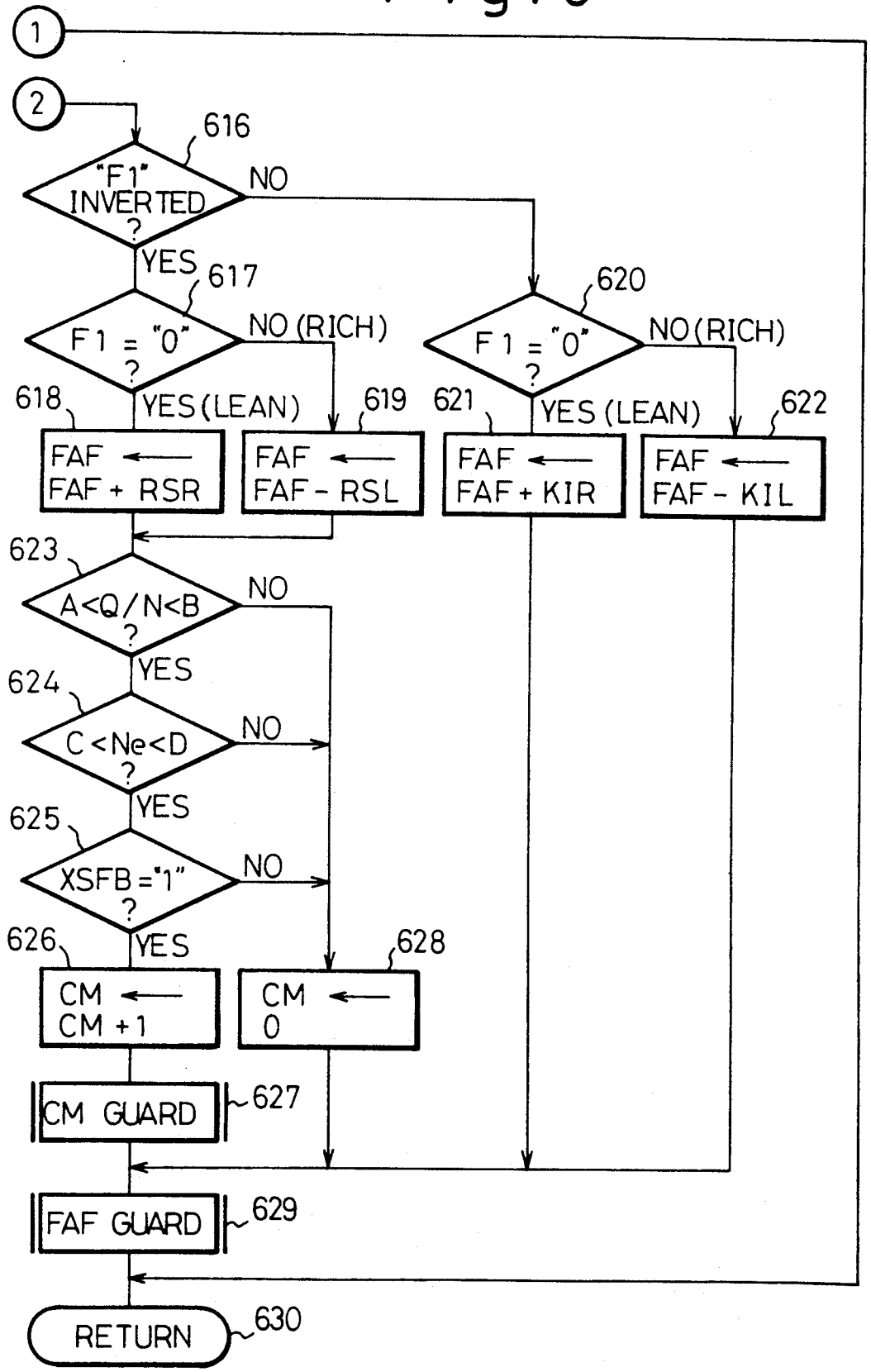
FIG. 6 is a flow chart for explaining the operation of the control circuit of FIG. 1.

FIG. 5 and FIG. 6 show a first air-fuel ratio feedback control routine for computing the air-fuel ratio correction coefficient FAF based on the output of the upstream side O₂ sensor, which is executed at a predetermined time, for example, every 4 ms.

At step 601, it is judged if the conditions of a closed loop (feedback) of the air-fuel ratio by the upstream side $O_2$ sensor 13 stand or not. For example, when the coolant water temperature is not more than a predetermined value, during engine startup, during an increase after startup, during an increase with a warm engine, during increase under power, during an OTP increase for preventing overheating of the catalyst, when the output signal of the upstream side $O_2$ sensor 13 does not invert even once, during a fuel cut (XFC="1"), during the supply of secondary air, etc., the closed loop conditions do not stand. In other cases, the closed loop conditions stand. When the closed loop conditions do not stand, the routine proceeds directly to step 630. Note that at this time the air-fuel ratio correction coefficient FAF may be made 1.0. On the other hand, when the closed loop conditions stand, the routine proceeds to step 602.

At step 602, the output $V_1$ of the upstream $O_2$ sensor 13 is converted from analog to digital format and fetched, then at step 603 it is judged if $V_1$ is less than a comparative voltage $V_{R1}$, for example, 0.45 V, that is, it is judged if the air-fuel ratio is rich or lean, that is, if lean ($V_1 \leq V_{R1}$), then at step 604 it is judged if the delay counter CDLY is positive or not. If CDLY>0, then at step 605, CDLY is made 0 and the routine proceeds to step 606. At step 606, the delay counter CDLY is decremented by 1, then at steps 607 and 608 the delay counter CDLY is guarded by the minimum value TDL. In this case, when the delay counter CDLY reaches the minimum value TDL, then at step 609 the air-fuel ratio flag Fl is made "0" (lean). Note that even if there is a change from rich to lean in the output of the upstream $O_2$ sensor 13, the minimum value TDL is a lean delay state for maintaining the judgement of a rich state and is defined as a negative value. On the other hand, if rich ($V_1 > V_{R1}$), then at step 610 it is judged if the delay counter CDLY is negative or not. If CDLY<0, then CDLY is made 0 at step 611 and the routine proceeds to step 612. At step 612, the delay counter CDLY is incremented by 1, then at steps 613 and 614 the delay counter CDLY is guarded by the maximum value TDR. In this case, when the delay counter CDLY reaches the maximum value TDR, the air-fuel ratio flag Fl is made "1" (rich) at step 615. Note that the maximum value TDR is a rich delay state for maintaining the judgement of the lean state even with a change from lean to rich and is defined as a positive value.

At step 616, it is judged if the sign of the air-fuel ratio flag Fl has inverted, that is, it is judged if the air-fuel ratio after the delay processing has inverted. If the air-fuel ratio has inverted, then at step 617, it is judged from the value of the air-fuel ratio flag Fl if there has been an inversion from rich to lean or an inversion from lean to rich. If the inversion is from rich to lean, then at step 618 the rich skip amount RSR is read out from the backup RAM 106 and FAF is increased skip-wise as FAF←FAF+RSR, while conversely if the inversion is from lean to rich, then at step 619 the lean skip amount RSL is read out from the backup RAM 106 and FAF is decreased skip-wise as FAF←FAF−RSL. That is, skip processing is performed.

If there is no inversion in the sign of the air-fuel ratio flag Fl at step 616, then integration processing is performed at steps 620, 621, and 622. That is, at step 620, it is judged if Fl="0". If Fl="0" (lean), then at step 621 FAF←FAF+KIR, while if Fl="1" (rich), then at step 622 FAF←FAF−KIL. Here, the integration constants KIR and KIL are set sufficiently smaller compared with the skip amounts RSR and RSL, that is, KIR (KIL)<RSR (RSL). Therefore, at step 621, the amount of fuel injection is gradually increased in the lean state (Fl="0") and at step 622 the amount of fuel injection is gradually decreased in the rich state (Fl="1").

Further, with each skip processing, steps 623 to 628 are used to count the times of inversion CM of the output $V_1$ of the upstream $O_2$ sensor 13. That is, at step 623, it is judged if the amount of intake air per rotation Q/N is in a predetermined range (A<Q/N<B), at step 624 it is judged if the rotational speed $N_e$ is in a predetermined range (C<$N_e$<D), and at step 625 it is judged if the downstream air-fuel ratio feedback control flag XSFB is "1" or not, that is, it is judged if the conditions of air-fuel ratio feedback by the downstream $O_2$ sensor 15 are satisfied or not. As a result, only when the engine is in a stable state (A<Q/N<B and C<$N_e$<D) and the conditions for air-fuel ratio feedback control by the downstream $O_2$ sensor 15 stand, the routine proceeds to step 626 where the counter CM is incremented by 1, then at step 627 the counter CM is guarded by the maximum value. In other cases, the routine proceeds to step 628 and the counter CM is cleared.

Next, the air-fuel ratio correction amount FAF computed at steps 618, 619, 621, and 622 is guarded at step 629 by the minimum value, for example, 0.8, and is guarded by the maximum value, for example, 1.2. By this, when the air-fuel ratio correction amount FAF becomes too large or too small for some reason or another, the air-fuel ratio of the engine is controlled by those values to prevent the mixture from becoming overly rich or overly lean. The FAF computed in the above way is stored in the RAM 105 and at step 630 the loop is ended.

FIG. 7 is a timing chart for supplementarily explaining the operation of the flow chart of FIG. 6. If a rich or lean judgement air-fuel ratio signal A/F is obtained by the output of the upstream $O_2$ sensor 13 as shown in FIG. 7(A), the delay counter CDLY is incremented in the rich state and decremented in the lean state, as shown in FIG. 7(B). As a result, as shown in FIG. 7(C), the delayed air-fuel ratio signal A/F' (corresponding to the flag Fl) is formed. For example, even if the air-fuel ratio signal A/F' changes from lean to rich at the time $t_1$, the delayed air-fuel ratio signal A/F' is held at the lean state for exactly the rich delay time TDR and then changes to rich at the time $t_2$. Even if the air-fuel ratio signal A/F changes from rich to lean at the time $t_3$, the delayed air-fuel ratio signal A/F' is held at the rich state for exactly the time corresponding to the lean delay time (−TDL), then changes to lean at the time $t_4$. However, if the air-fuel ratio signal A/F' inverts in the short time of the rich delay time TDR as shown at times $t_5$, $t_6$, and $t_7$, it takes time for the delay counter CDLY to reach the maximum value TDR. As a result the delayed air-fuel ratio signal A/F' inverts at the time $t_8$. That is, the delayed air-fuel ratio signal A/F' is stabler compared with the pre-delayed air-fuel ratio signal A/F. Based on the delayed, stabilized air-fuel ratio signal A/F', the air-fuel ratio correction coefficient FAF shown in FIG. 7(D) is obtained.

Next, an explanation will be made of the second air-fuel ratio feedback control by the downstream $O_2$ sensor 15. As the second air-fuel ratio feedback control, there are the system where the skip amounts RSR and RSL, the integration constants KIR and KIL, the delay times TDR and TDL, or the output $V_1$ of the upstream $O_2$ sensor 13 is made variable and the system wherein the second air-fuel ratio correction coefficient FAF2 is introduced.

For example, if the rich skip amount RSR is made larger, it is possible to shift the control air-fuel ratio to the rich side and even if the lean skip amount RSL is made smaller, it is possible to shift the control air-fuel ratio to the rich side. On the other hand, if the lean skip amount RSL is made larger, the control air-fuel ratio may be shifted to the lean side while even if the rich skip amount RSR is made smaller, the control air-fuel ratio can be shifted to the lean side. Therefore, it is possible to control the air-fuel ratio by correcting the rich skip amount RSR and the lean skip amount RSL in accordance with the output of the downstream $O_2$ sensor 15. Further, if the rich integration constant KIR is made larger, it is possible to shift the control air-fuel ratio to the rich side and even if the lean integration constant KIL is made smaller, the control air-fuel ratio may be shifted to the rich side. On the other hand, if the lean integration constant KIL is made larger, the control air-fuel ratio may be shifted to the lean side, while even if the rich integration constant KIR is made smaller, the control air-fuel ratio may be shifted to the lean side. Therefore, it is possible to control the air-fuel ratio by correcting the rich integration constant KIR and the lean integration constant KIL in accordance with the output of the downstream $O_2$ sensor 15. If the rich delay time TDR is set large or the lean delay time ($-$TDR) is set small, the control air-fuel ratio may be shifted to the rich side, while conversely if the lean delay time ($-$TDL) is set large or the rich delay time (TDR) is set small, the control air-fuel ratio may be shifted to the lean side. That is, it is possible to control the air-fuel ratio by correcting the delay times TDR and TDL in accordance with the output of the downstream $O_2$ sensor 15. Further, if the comparative voltage $V_{R1}$ is made large, the control air-fuel ratio can be shifted to the rich side and if the comparative voltage $V_{R1}$ is made small, the control air-fuel ratio may be shifted to the lean side. Therefore, the air-fuel ratio may be controlled by correcting the comparative voltage $V_{R1}$ in accordance with the output of the downstream $O_2$ sensor.

There are advantages to making the skip amounts, integration constants, delay times, or comparative voltage variable according to the downstream $O_2$ sensor. For example, with the delay times, the air-fuel ratio may be adjusted extremely finely, while with the skip amounts, control with a good response is possible without lengthening the feedback period of the air-fuel ratio such as in the case of the delay times. Therefore, it is naturally possible to combine two or more of these variable amounts in use.

Next, an explanation will be made of a double $O_2$ sensor system wherein the skip amounts serving as the air-fuel ratio feedback control constants are made variable.

Figure 8:
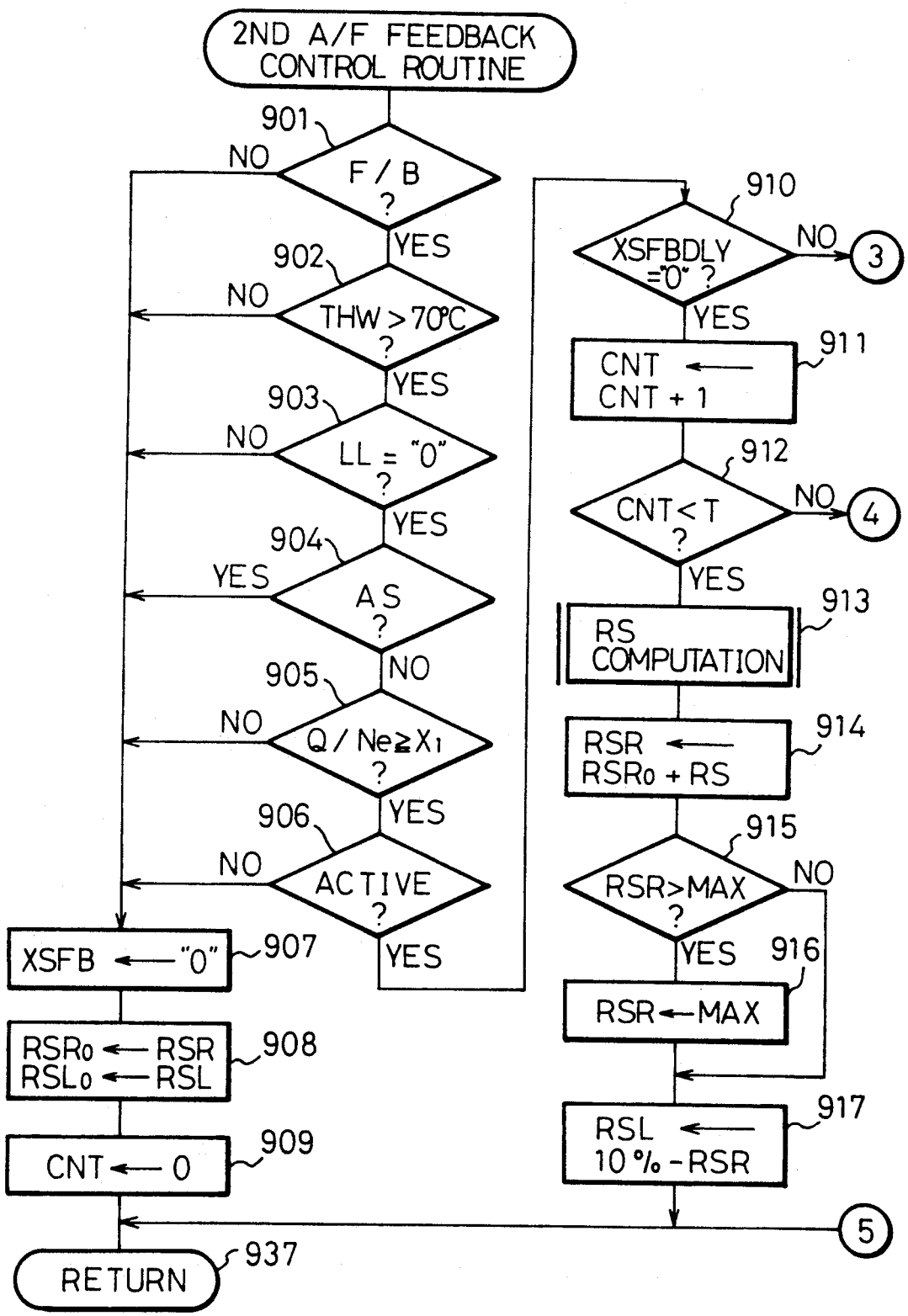
FIG. 8 is a flow chart for explaining the operation of the control circuit of FIG. 1.
Figure 9:
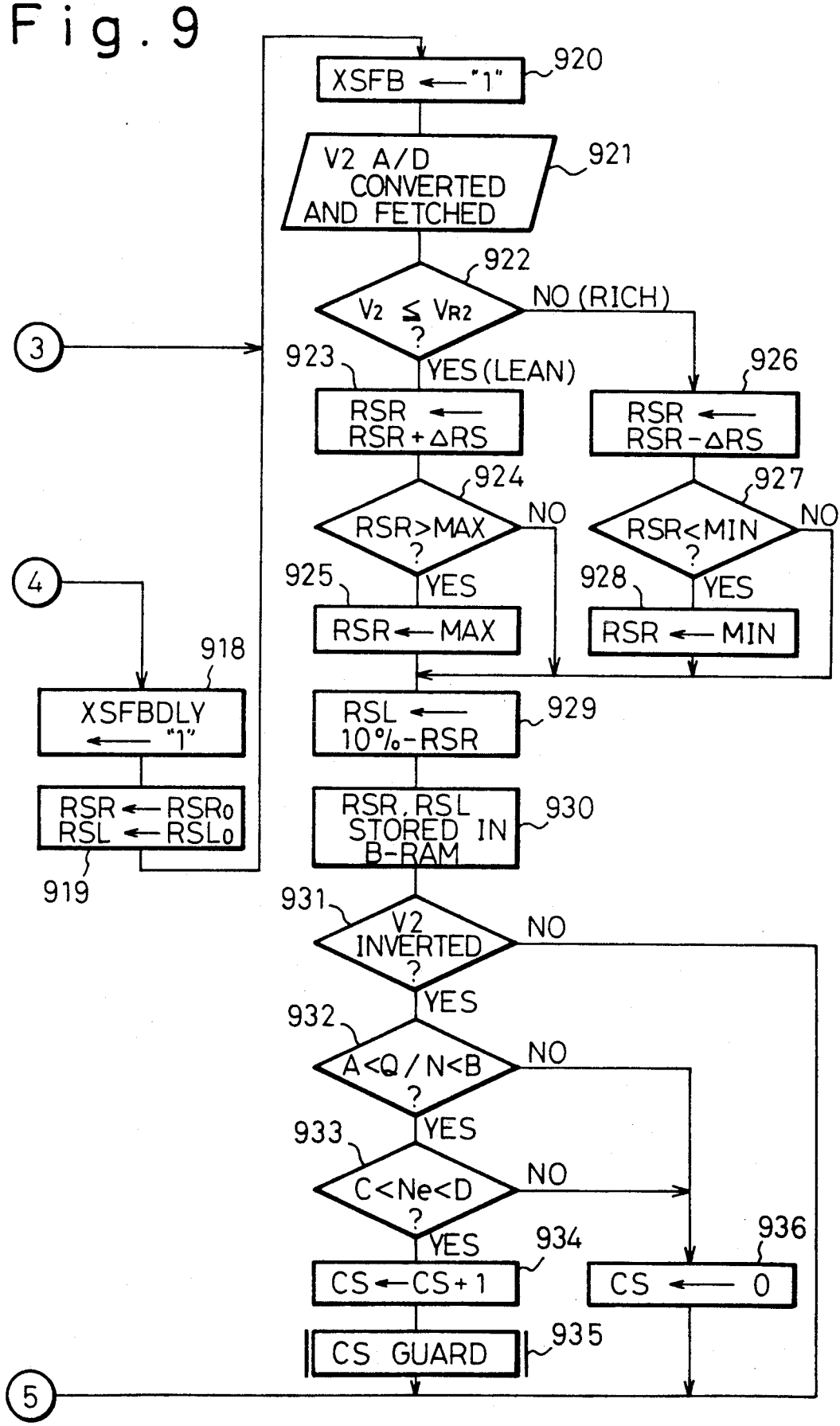
FIG. 9 is a flow chart for explaining the operation of the control circuit of FIG. 1.

FIG. 8 and FIG. 9 show the second air-fuel ratio feedback control routine based on the output of the downstream $O_2$ sensor 15, which is executed at predetermined times, for example, every 512 ms. At steps 901 to 906, it is judged if the closed loop conditions stand by the downstream $O_2$ sensor 15. For example, in addition to when the closed loop conditions by the upstream $O_2$ sensor 13 do not stand (step 901), when the coolant water temperature THW is lower than a predetermined value (for example, 70° C.) (step 902), when the throttle valve 16 is closed (LL="1") (step 903), when the secondary air is introduced based on the rotational speed $N_e$, the vehicle speed, the signal LL of the idle switch 17, the coolant water temperature THW, etc. (step 904), when the load is light ($Q/N_e<X_1$) (step 905), when the downstream $O_2$ sensor 15 is not activated (step 906), etc., the closed loop conditions do not stand while in other cases the closed loop conditions do stand. If the closed loop conditions do not stand, the routine proceeds to step 907, while if the closed loop conditions do stand, the routine proceeds to step 910. Further, during the above-mentioned fuel cut (XFC="1"), the closed loop conditions due to the upstream $O_2$ sensor do not stand, so the closed loop conditions due to the downstream $O_2$ sensor also do not stand.

Figure 10:
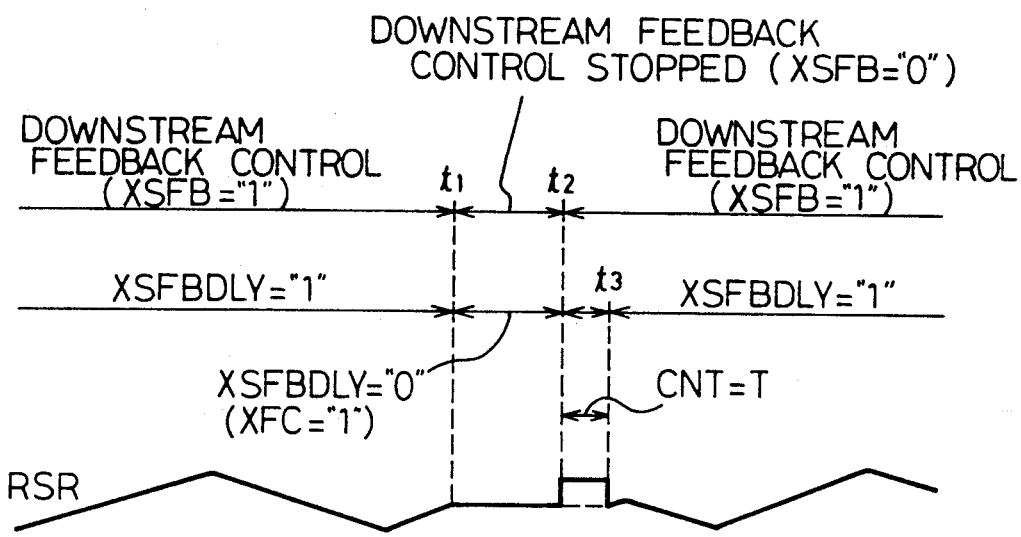
FIG. 10 is a timing chart for supplementarily explaining the flow charts of FIG. 8 and FIG. 9.

That is, at the time $t_1$ to $t_2$ of FIG. 10, if the closed loop conditions do not stand since the fuel cut is underway (XFC="1"), the flow of steps 907, 908, and 909 is executed. At step 907, the air-fuel ratio feedback control execution flag XSFB based on the downstream $O_2$ sensor 15 is reset ("0"), while at step 908, the rich skip amount RSR and the lean skip amount RSL are read out from the backup RAM 106 and made the RAM values $RSR_0$ and $RSL_0$, then at step 909 the counter CNT for counting the delay time for resuming the air-fuel ratio feedback control by the downstream $O_2$ sensor 15 is cleared. Then the routine proceeds to step 937. Note that the air-fuel ratio feedback control execution flag XSFB is used at step 625 in FIG. 6.

At the time $t_2$ of FIG. 10, if the closed loop conditions for the air-fuel ratio feedback control by the downstream $O_2$ sensor 15 stand, the flow of steps 901 to 906 proceeds to step 910. At step 910, it is judged if the delay flag XSFBLY is "0" or not. At the time $t_2$, the XSFBLDY is made "0" by the routine of FIG. 3, so the flow of steps 911 to 917 is executed.

Figure 11:
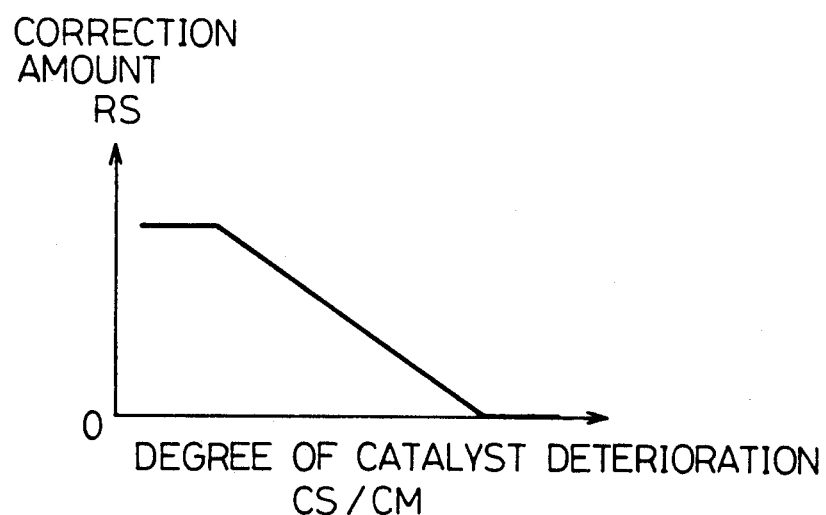
FIG. 11 is a timing chart for supplementarily explaining the flow charts of FIG. 8 and FIG. 9.

An explanation will now be made of steps 911 to 917. At step 911, the counter CNT is incremented by 1 so as to count the delay time. At step 912, it is judged if the value of the counter CNT has reached the delay time T (in this case, a constant value). At the time $t_2$ of FIG. 10, CNT<T, so the routine proceeds to step 913. At step 913, the correction amount RS of the rich skip amount $RSR_0$ is computed in accordance with the degree of deterioration of the three-way catalyst of the catalytic converter 12. That is, if the three-way catalyst is deteriorated, the number of inversions CS of the downstream $O_2$ sensor 15 mentioned later decreases and therefore the ratio CS/CM between the number of inversions CS and the number of inversions CM of the upstream $O_2$ sensor shows the degree of deterioration of the three-way catalyst, so the primary function as shown in FIG. 11 is stored in advance in the ROM 104 and the correction amount RS is calculated by interpolation. As shown in FIG. 11, if the degree of deterioration CS/CM is small, the correction amount RS is made larger and if the degree of deterioration CS/CM is large, the correction amount RS is made smaller. Further, the new interpolation calculation of the correction amount RS should be performed when the CM becomes more than a predetermined value. That is, unless then CS/CM value is one after a steady engine state (A<Q/N<B and C<$N_e$<D) and a state during feedback by the downstream $O_2$ sensor continue to a certain extent, the accurate degree of deterioration of the catalyst is not shown. Further, when the CM does not become more than a predetermined value, if the step 913 is executed, use may be made of the RS calculated previously as the RS value. Also, as the method of calculating the degree of deterioration of the catalyst, for example, there are the method of making alternate use of the cumulative distance of travel of the vehicle or the method of making alternate use of the total cumulative value of the amount of intake air of the engine in past operation. The magnitude of the set correction amount RS selected is a magnitude where the excess oxygen in the catalyst absorbed and held during the fuel cut is substantially exactly consumed in the above-mentioned delay time T. At step 914, the rich skip amount RSR is read out from the RAM 105, correction is made to the rich side as $$RSR \leftarrow RSR_0 + RS$$

and at steps 915 and 916, the rich skip amount RSR is guarded by the maximum value MAX ($=7.5\%$). At step 917, the lean skip amount RSL is stored in the backup RAM 106 as $$RSL \leftarrow 10\% - RSR$$

That is, $RSR + RSL = 10$ percent is set. Then, the routine proceeds to step 937.

Next, at the time $t_3$ of FIG. 10, the value of the counter CNT reaches the predetermined value T. As a result, the flow at step 912 switches to step 918 and the flow of steps 918 to 936 is executed. That is, at step 918, the delay flag XSFBDLY is set ("1"), then at step 919 the values $RSR_0$ and $RSL_0$ stored as the RAM values at the time $t_1$ at FIG. 10 are used as the skip amounts RSR and RSL, then the flow of steps 920 to 935 are executed.

An explanation will now be made regarding the flow of steps 920 to 930. At step 920, the air-fuel ratio feedback control execution flag XSFB is set ("1"). At step 921, the output $V_2$ of the downstream $O_2$ sensor 15 is converted from analog to digital format and fetched, then at step 922 it is judged if $V_2$ is less than a comparative voltage $V_{R2}$, for example, 0.55 V, that is, it is judged if the air-fuel ratio is rich or lean. Note that the comparative voltage $V_{R2}$ is set higher than the comparative voltage $V_{R1}$ of the output of the upstream $O_2$ sensor 13 in consideration of the fact that the output characteristics due to the effects of the raw gas differ upstream and downstream of the catalytic converter 12, but this may be set as desired. As a result, if $V_2 \leq V_{R2}$ (lean), the routine proceeds to steps 923, 924, and 925, while if $V_2 > V_{R2}$ (rich), the routine proceeds to steps 926, 927, and 928. That is, at step 923, $RSR \leftarrow RSR + \Delta RS$ (constant value), that is, the rich skip amount RSR is increased to shift the air-fuel ratio to the rich side, and at steps 924 and 925, the RSR is guarded by the maximum value MAX ($=7.5\%$). On the other hand, at step 926, $RSR \leftarrow RSR - \Delta RS$, that is, the rich skip amount RSR is decreased and the air-fuel ratio is shifted to the lean side, and at steps 927 and 928, the RSR is guarded by the minimum value MIN ($=2.5\%$). Note that the minimum value MIN is the value of a level not detracted from by transitory following characteristics, while the maximum value MAX is a value of a level where the fluctuations in the air-fuel ratio do not cause a deterioration of the drivability.

At step 929, the lean skip amount RSL is made $$RSL \leftarrow 10\% - RSR$$

That is, $RSR + RSL = 10\%$ is set.

At step 930, the skip amounts RSR and RSL are stored in the backup RAM 106.

At steps 931 to 935, the number of inversions CS of the output $V_2$ of the downstream $O_2$ sensor are counted.

That is, at step 931, it is judged if the output $V_2$ of the downstream $O_2$ sensor 15 has inverted. Only when it has inverted is the flow of steps 932 to 936 executed. That is, at step 932, it is judged if the amount of intake air per rotation Q/N is in a predetermined range ($A < Q/N < B$) or not, while at step 933 it is judged if the rotational speed $N_e$ is in a predetermined range ($C < N_e < D$) or not. As a result, only when the engine is in a stable state ($A < Q/N < B$ and $C < N < D$), the routine proceeds to step 934, the counter CS is incremented by 1, then at step 935 the counter CS is guarded by the maximum value. In other cases, the routine proceeds to step 936, where the counter CS is cleared. Then, the routine proceeds to step 937.

Figure 12:
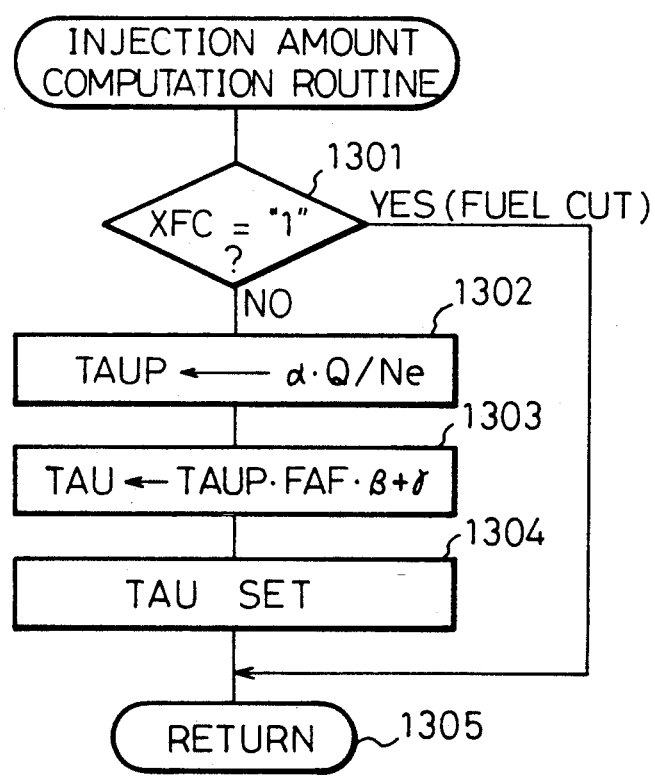
FIG. 12 is a flow chart for explaining the operation of the control circuit of FIG. 1.

FIG. 12 shows the routine for computation of the amount of fuel injection.

Referring to FIG. 12, at step 1301, it is judged if the fuel cut flag XFC is set to "1" or not. If the fuel cut flag XFC is not set, the routine proceeds to step 1302, where the basic fuel injection amount TAUP is calculated from the intake air amount Q and the engine rotational speed $N_e$. Note that $\alpha$ is a coefficient of a fixed value. Next, at step 1303, the fuel injection amount TAU is calculated based on the following equation:

$$TAU = TAUP \cdot FAF \cdot \beta + \tau$$

where $\beta$ is the coefficient of increase for increases at low temperatures, increases at acceleration, etc., and $\tau$ is the invalid injection time.

Next, at step 1304, the fuel injection amount TAU is preset to the down counter 108, and the flip-flop 109 is set.

Next, another embodiment for executing the control explained above will be shown. An explanation will be made of the flow chart.

Figure 13:
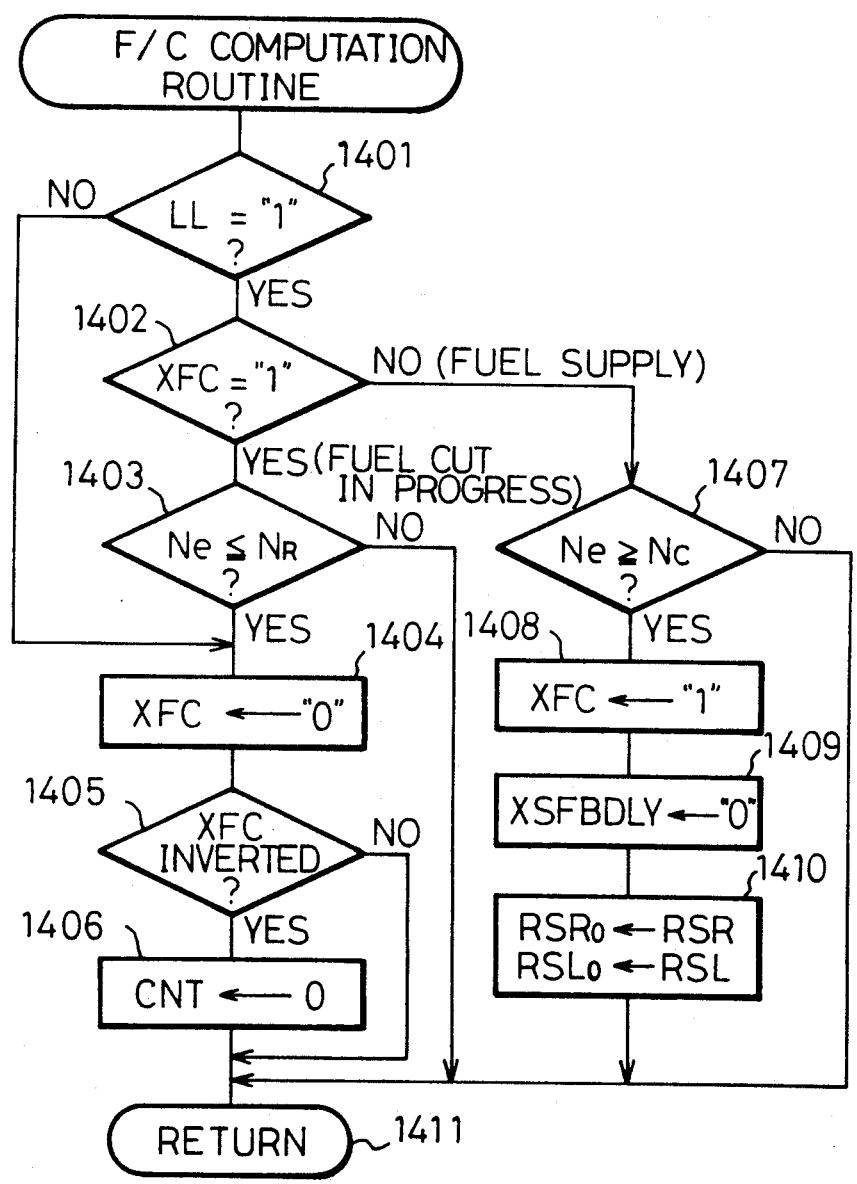
FIG. 13 is a flow chart for explaining the operation of the control circuit of FIG. 1.

FIG. 13 shows the same fuel cut processing routine as in FIG. 3. At step 1401, it is judged if the output signal LL of the idle switch 5 is "1" (throttle valve closed) or not. If the result is that it is closed (LL="1"), the routine proceeds to step 1402, while if not closed (LL="0"), the routine proceeds to step 1404, where the flag XFC is reset ("0").

At step 1402, it is judged if the flag XFC showing if a fuel cut is in progress or not at the present time is "1" or not. If the result is that a fuel cut is in progress (XFC="1"), then the flow of steps 1403 to 1406 is executed, while if a fuel cut is not in progress (XFC="0"), the flow from steps 1407 to 1410 is executed.

An explanation will be made of steps 1403 to 1406. At step 1403, the rotational speed $N_e$ is read out from the RAM 105 and it is judged if it is less than the fuel cut recovery rotational speed $N_R$. Only when the result is that $N_e \leq N_R$, the routine proceeds to step 1404 and the flag XFC is reset ("0"). Further, at step 1405, it is judged if the flag XFC has inverted from "1" to "0" or not, that is, it is judged if the timing is for resumption of the fuel supply from the fuel cut (fuel cut recovery) or not. If it is that timing, then at step 1406, the time counter CNT for delaying the resumption of the air-fuel ratio feedback control by the downstream $O_2$ sensor 15 of FIG. 15, mentioned later, is cleared and the routine proceeds to step 1411.

An explanation will now be made of steps 1407 to 1410. At step 1407, the rotational speed $N_e$ is read out from the RAM 105 and it is judged if it is larger than the fuel cut rotational speed $N_C$. Only when the result is that $N_e \geq N_C$, the routine proceeds to step 1408, where the flag XFC is set ("1"). At step 1409, the flag XSFBDLY for delaying the resumption of the air-fuel ratio feedback control by the downstream $O_2$ sensor 15 is reset ("0"), and at step 1410, the skip amounts RSR and RSL learned during the air-fuel ratio feedback control by the downstream $O_2$ sensor 15 and stored in the backup RAM 106 are used as $RSR_0$ and $RSL_0$ and stored in the RAM 105, then the routine proceeds to step 1411. Note that, as mentioned later, the air-fuel ratio feedback control by the downstream $O_2$ sensor 15 is stopped even during a fuel cut (XFC="1"), so the backup RAM values RSR and RSL just before the fuel cut is entered are stored as the $RSR_0$ and $RSL_0$ in the RAM 105 for the first time by the routine of FIG. 13. Then, at step 1411, the routine is ended.

Figure 14:
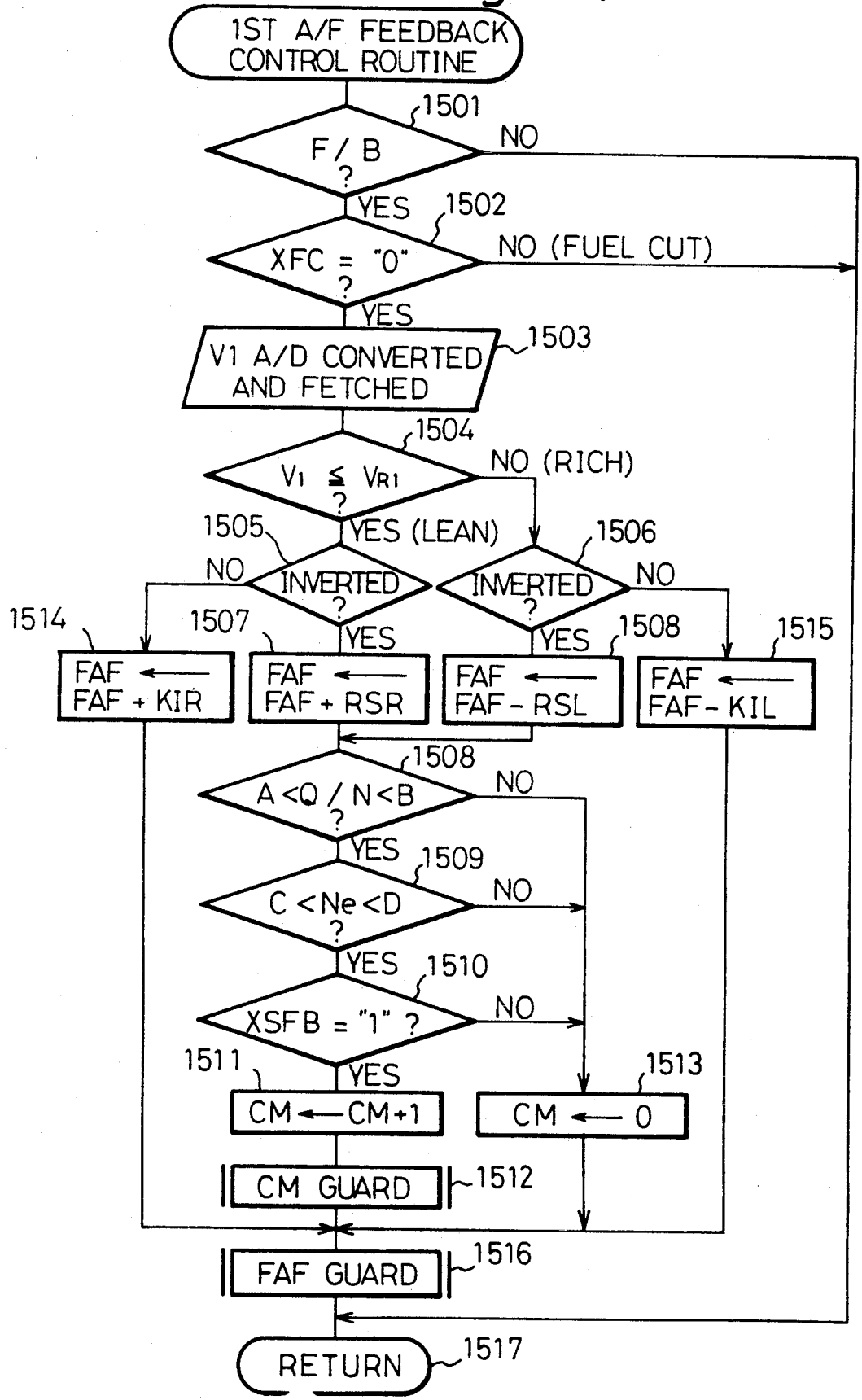
FIG. 14 is a flow chart for explaining the operation of the control circuit of FIG. 1.
Figure 15:
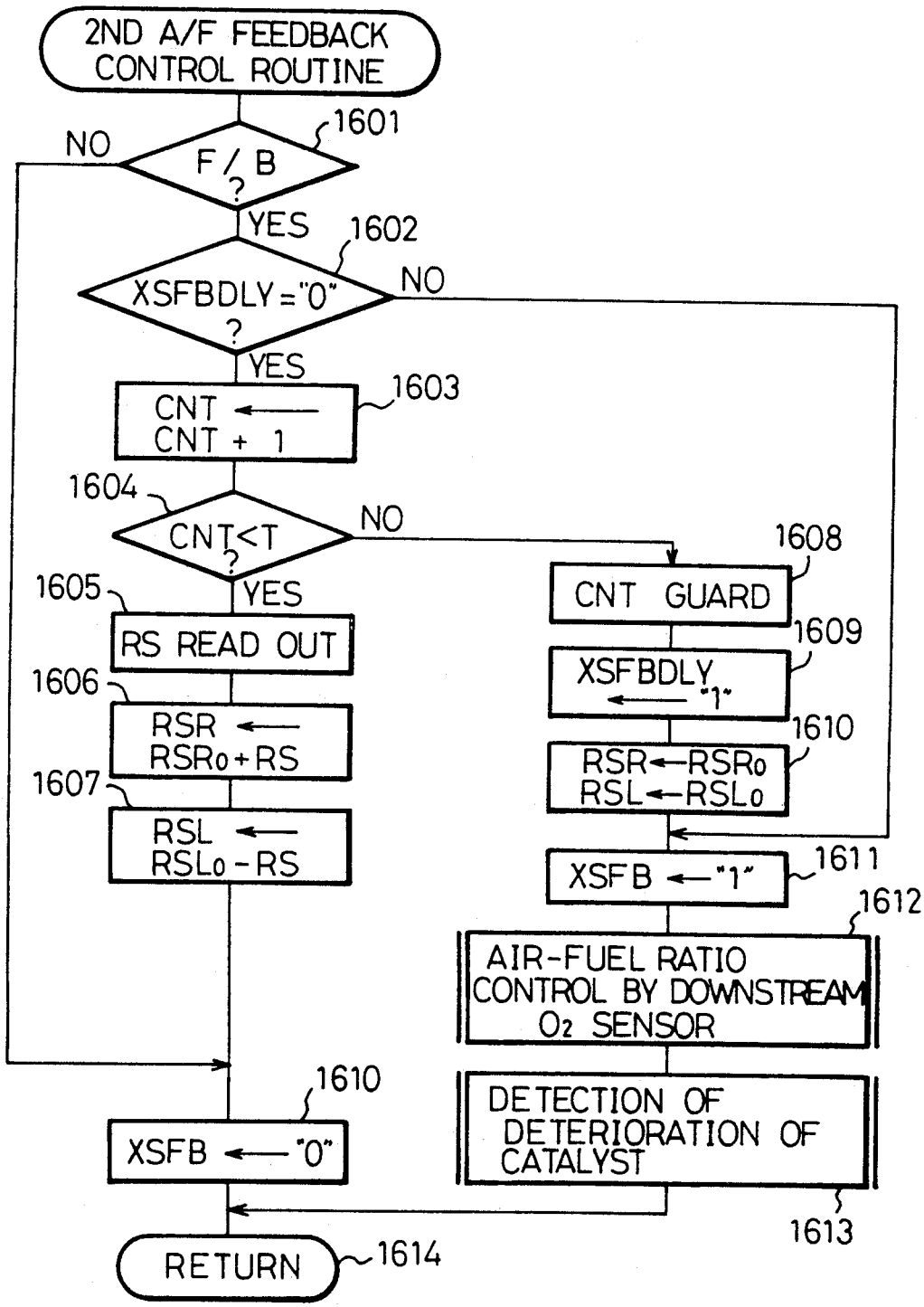
FIG. 15 is a flow chart for explaining the operation of the control circuit of FIG. 1.
Figure 16:
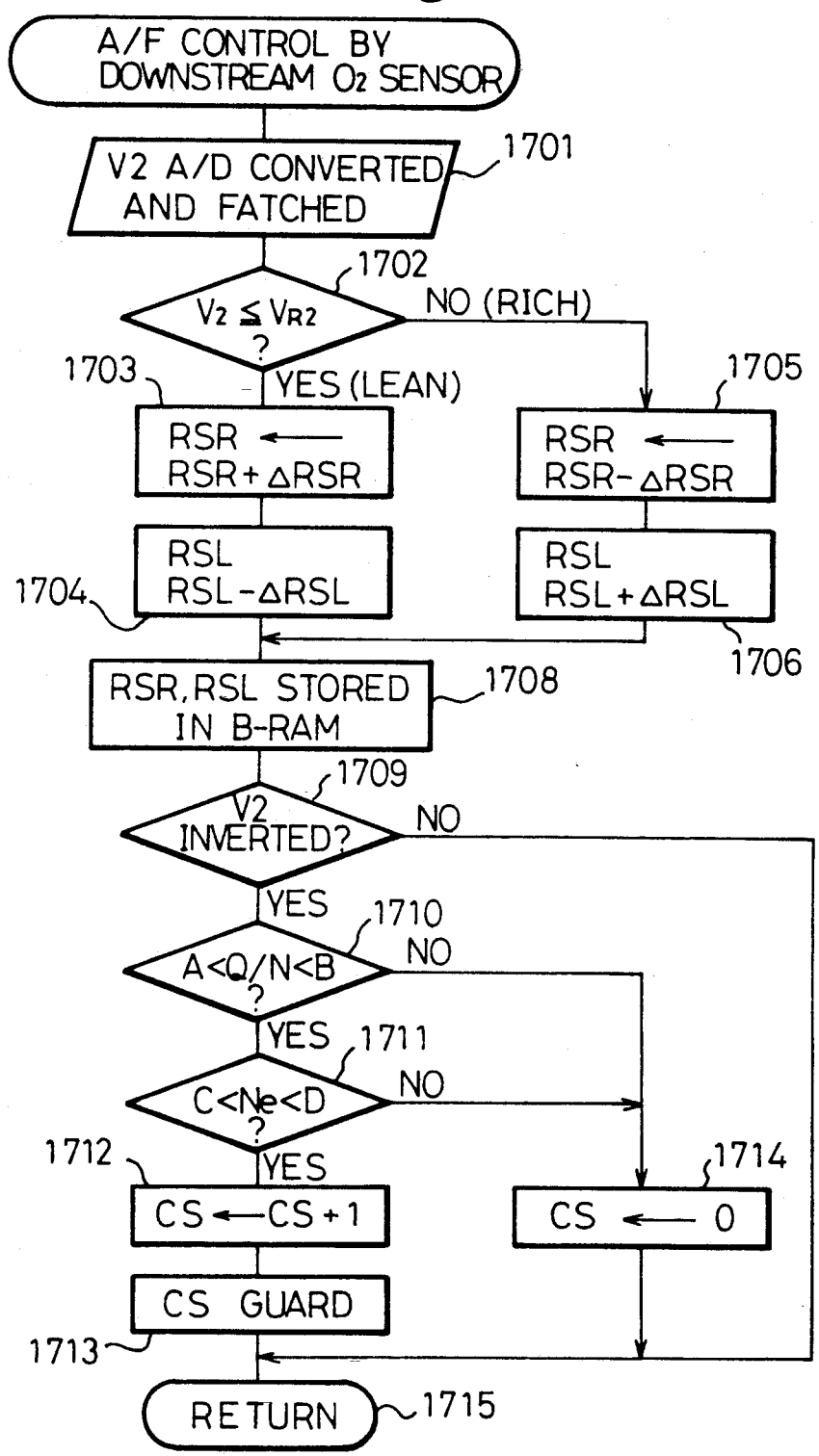
FIG. 16 is a flow chart for explaining the operation of the control circuit of FIG. 1.

FIG. 14 shows a first routine for air-fuel ratio feedback control for computing the air-fuel ratio correction coefficient FAF based on the output of the upstream $O_2$ sensor 13 in the same way as FIG. 15 and FIG. 16. That is, at step 1501, it is judged if the closed loop (feedback) conditions of the air-fuel ratio by the upstream $O_2$ sensor 13 stand. For example, when the coolant water temperature is below a predetermined value, during engine startup, during an increase after startup, during an increase with a warm engine, during an increase under power, during an increase of OTP for preventing catalyst overheating, when the output signal of the upstream $O_2$ sensor 13 does not invert even once, during a supply of secondary air, etc., the closed loop conditions do not stand. Further, at step 1502, the closed loop conditions are considered to not stand even during a fuel cut (XFC="1"). Note that even during a fuel cut may be considered control to make the air-fuel ratio upstream of the catalyst lean. When the closed loop conditions do not stand, the routine proceeds directly to step 1517. Note that at this time, the air-fuel ratio correction coefficient FAF may be made 1.0. On the other hand, when the closed loop conditions stand, the routine proceeds to step 1503.

At step 1503, the output $V_1$ of the upstream $O_2$ sensor 13 is converted from an analog to digital format and fetched and at step 1504 it is judged if $V_1$ is less than a comparative voltage $V_{R1}$, that is, it is judged if the air-fuel ratio is rich or lean, that is, if lean ($V_1 \leq V_{R1}$), at step 1505, it is judged if the air-fuel ratio upstream of the catalyst has inverted from rich to lean, while if rich ($V_1 > V_{R2}$), it is judged at step 1506 if the air-fuel ratio upstream of the catalyst has inverted from lean to rich.

If the ratio has inverted from rich to lean at step 1505, then at step 1507 the rich skip amount RSR is read out from the backup RAM 106 and FAF is increased skip-wise as FAF←FAF+RSR, while conversely if the ratio has inverted from lean to rich at step 1506, then at step 1508 the lean skip amount RSL is read out from the backup RAM 106 and the FAF is skip-wise decreased as FAF←FAF−RSL. That is, skip processing is performed. Further, with each skip processing, by steps 1508 to 1513, the number of inversions CM of the output Cl of the upstream $O_2$ sensor 13 is counted. That is, at step 1508, it is judged if the amount of intake air per rotation Q/N falls in a predetermined range (A<Q/N<B), at step 1509 it is judged if the rotational speed $N_e$ falls in a predetermined range (C<$N_e$<D), and at step 1510 it is judged if the downstream air-fuel ratio feedback control flag XSFB is "1" or not, that is, if the conditions for air-fuel ratio feedback by the downstream $O_2$ sensor 15 are satisfied or not. Only when the result is that the engine is in a stable state (A<Q/N<B and C<$N_e$<D) and the conditions of air-fuel ratio feedback control by the downstream $O_2$ sensor 15 stand, the routine proceeds to step 1511, the counter CM is incremented by 1, then at step 1512, the counter CM is guarded by the maximum value. In other cases, the routine proceeds to step 151 and the counter CM is cleared.

If the air-fuel ratio upstream of the catalyst does not invert at step 1505, then at step 1514 FAF←FAF+KIR is set, while if the air-fuel ratio upstream of the catalyst does not invert at step 1506, then at step 1515, FAF←FAF−KIR is set. Here, the integration constants KIR and KIL are set sufficiently smaller compared with the skip amounts RSR and RSL, that is, KIR (KIL)<RSR (RSL). Therefore, at step 1514, the amount of fuel injection is gradually increased in the lean state, while at step 1515 the amount of fuel injection is gradually decreased in the rich state.

Next, the air-fuel ratio correction coefficient FAF computed at steps 1507, 1508, 1514, and 1515 is guarded at step 1516 by the minimum value, for example, 0.8, and guarded by the maximum value, for example, 1.2. By this, when the air-fuel ratio correction coefficient FAF becomes too large or becomes too small for some reason or another, the air-fuel ratio of the engine is controlled by the value and prevented from being overly rich or overly lean. The thus computed FAF is stored in the RAM 105. At step 1517, the loop is ended.

FIG. 15 shows a second routine for air-fuel ratio feedback control based on the output of the downstream $O_2$ sensor 13 in the same way as FIG. 8 and FIG. 9. At step 1601, like at steps 901 to 906 of FIG. 8, it is judged if the closed loop conditions by the downstream $O_2$ sensor 15 stand. For example, in addition to when the closed loop conditions by the upstream $O_2$ sensor 13 stand, when the coolant water temperature THW is below a predetermined value (for example, 70° C.), when the throttle valve 16 is closed (LL="1"), when the secondary air is introduced based on the rotational speed $N_e$, the vehicle speed, the signal LL of the idle switch 17, the coolant water temperature THW, etc., when the load is light (Q/$N_e$<$X_1$), when the downstream $O_2$ sensor 15 is not activated, etc., the closed loop conditions do not stand. In other cases, the closed loop conditions stand. If the closed loop conditions do not stand, the routine proceeds to step 1610. If the closed loop conditions stand, the routine proceeds to step 1602. Further, even in this case, during the above-mentioned fuel cut (XFC="1"), the closed loop conditions by the upstream $O_2$ sensor do not stand, so the closed loop conditions by the downstream $O_2$ sensor also do not stand.

At step 1602, it is judged if the delay flag XSFBDLY (see step 1409 of FIG. 13) for delaying the air-fuel ratio feedback control by the downstream $O_2$ sensor 15 is "0" or not. If "0", despite the closed loop conditions by the downstream $O_2$ sensor 15 standing, the air-fuel ratio feedback control by the downstream $O_2$ sensor 15 is stopped for a fixed period T. This is because the counter CNT cleared during the fuel cut is incremented at step 1603, then at step 1604 it is judged if the counter CNT has reached a predetermined value T. That is, if CNT<T, then at step 1605, the correction amount RS of the skip amounts RSR and RSL detected in the later mentioned catalyst deterioration detection routine and stored in the backup RAM 106 the output $V_1$ of the upstream $O_2$ sensor 13 is read out, use is made of the values $RSR_0$ and $RSL_0$ stored in the RAM 105 at step 1410 of FIG. 13, at step 1606, the rich skip amount RSR is made $$RSR \leftarrow RSR_0 + RS$$

and at step 1607

$$RSL \leftarrow RSL_0 - RS$$

That is, the skip amounts RSR and RSL during the delay time T are obtained by adding and subtracting the correction value RS to the skip amounts RSR and RSL just before the fuel cut begins. As mentioned later, the correction value RS is a positive value and further is made smaller the larger the degree of deterioration of the catalyst, so the rich skip amount RSR and the lean skip amount RSL during the delay time become the values obtained by correcting the air-fuel ratio to the rich side in accordance with the degree of deterioration of the catalyst. Here, the rich skip amount RSR and the lean skip amount RSL before the fuel cut begins are stored as $RSR_0$ and $RSL_0$ and these have the correction value RS added to and subtracted from them because up until just before the fuel cut, the air-fuel ratio should become extremely close in value to the stoichiometric air-fuel ratio due to the feedback control by the downstream $O_2$ sensor 15, so if the correction value RS is added to or subtracted from the value, then the air-fuel ratio on the rich side aimed at during the delay time can be accurately obtained.

Next, at step 1610, the flag XSFB showing that the air-fuel ratio feedback control by the downstream $O_2$ sensor 15 is reset to "0". Further, the flag XSFB is used at step 1511 of FIG. 14 as a condition for the counting of the number of inversions CM of the upstream $O_2$ sensor 13.

At the above-mentioned step 1604, if the delay time becomes more than T, the routine proceeds to step 1608, where the counter CNT is guarded by the maximum value. At step 1609, the feedback delay execution flag XSFBDLY is set to "1". When the step 1602 of the routine is next arrived at, the routine is made to proceed directly to step 1611. At step 1610 after step 1609, the $RSR_0$ and $RSL_0$ stored in the RAM 105 at step 1410 of FIG. 13 are made the rich skip amount RSR and the leans skip amount RSL, that is, the rich skip amount and the lean skip amount RSL before the fuel cut begins are set to the values of the rich skip amount RSR and the lean skip amount RSL, whereby the initial values of the time of resumption of the feedback by the downstream $O_2$ sensor 15 at step 1612 are set to.

At step 1611, the feedback flag XSFB by the downstream $O_2$ sensor 15 is made "1", then at step 1612, the air-fuel ratio feedback control by the downstream $O_2$ sensor is executed, at step 1613, the degree of deterioration of the catalyst is detected, and at step 1614 the routine is ended.

FIG. 16 shows details of the step 1612 of air-fuel ratio feedback control based on the downstream $O_2$ sensor 15. That is, at step 1701, the output $V_2$ of the downstream $O_2$ sensor 15 is converted from an analog to digital format and fetched and at step 1702 it is judged if $V_2$ is less than a comparative voltage $V_{R2}$, that is, it is judged if the air-fuel ratio is rich or lean. If the result is that $V_2 \leq V_{R2}$ (lean), at step 1703, the rich skip amount RSR is increased by exactly $\Delta RSR$, and at step 1704, the lean skip amount RSL is decreased by exactly $\Delta RSL$ and the air-fuel ratio is corrected to the rich side as a whole. Conversely, if $V_2 > V_{R2}$ (rich), at step 1705, the rich skip amount RSR is decreased by exactly $\Delta RSR$, and at step 1706, the lean skip amount RSL is increased by exactly $\Delta RSL$ and the air-fuel ratio is corrected to the lean side as a whole. At step 1708, the skip amounts RSR and RSL are stored in the backup RAM 106.

At steps 1709 to 1713, the number of inversions CS of the output $V_2$ of the downstream $O_2$ sensor is counted. That is, at step 1709, it is judged if the output $V_2$ of the downstream $O_2$ sensor 15 has inverted or not. Only when it has inverted, the flow of steps 1710 to 1714 is executed. That is, at step 1710, it is judged if the amount of intake air per rotation Q/N is in a predetermined range ($A < Q/N < B$) and at step 1711 it is judged if the rotational speed $N_e$ is in a predetermined range ($C < N_e < D$). Only when the result is that the engine is in a stable state ($A < Q/N < B$ and $C < N_e < D$), the routine proceeds to step 1712 and the counter CS is incremented by 1, then at step 1713, the counter CS is guarded by the maximum value. In other cases, the routine proceeds to step 1714, where the counter CS is cleared. Then the routine proceeds to step 1715.

Figure 17:
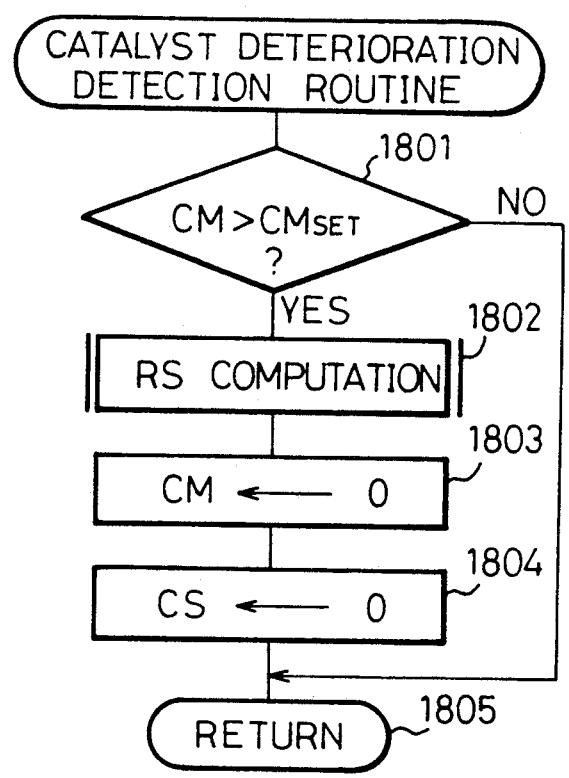
FIG. 17 is a flow chart for explaining the operation of the control circuit of FIG. 1.

FIG. 17 is a flow chart showing the details of the step 1613 for detection of the deterioration of the catalyst. That is, at step 1801, it is judged if the number of inversions CM of the upstream $O_2$ sensor 13 counted at step 1511 of FIG. 14 has reached a predetermined value $CM_{SET}$. If it has not reached it, the routine proceeds to step 1805, where the routine ends. If CM reaches the predetermined value $CM_{SET}$, then at step 1802 the RS value based on the number of inversions CS of the downstream $O_2$ sensor 15 is computed and stored in the backup RAM 106. For the method of computation, it is possible to read it out from a map storing the relationship between RS and CS in the same way as step 913 of FIG. 8 or, since the smaller the CS, the larger the degree of deterioration, the RS may be found by an equation where it decreases in accordance with an increase of the CS. Also, in the present embodiment, in the period where the subfeedback is continuously executed, RS is found only when the upstream $O_2$ sensor 13 inverts a predetermined number of times, so the accurate correction value RS in accordance with the degree of deterioration of the catalyst can be obtained (see step 1801 in FIG. 17).

With the air-fuel ratio correction coefficient FAF computed by the routines of FIG. 13 to FIG. 17, the actual fuel injection amount TAU is computed and the fuel injection executed by the fuel injection computing routine of FIG. 12.

Further, in the above-mentioned embodiment, an explanation was made of the resumption of the air-fuel ratio feedback control by the downstream $O_2$ sensor 15 after the fuel cut, but the present invention may also be applied to the resumption of the air-fuel ratio feedback control by the downstream $O_2$ sensor 15 after the introduction of secondary air or other lean air-fuel ratio operating state.

Further, the present invention may be applied even to a double $O_2$ sensor system where other control constants in the air-fuel ratio feedback control by the upstream $O_2$ sensor, for example, the delay times, the integration constants, etc. are corrected by the output of the downstream $O_2$ sensor or even to a double $O_2$ sensor system where a second air-fuel ratio correction coefficient is introduced. Further, the controllability may be improved by simultaneous control of two of the skip amounts, delay times, and integration constants. Also, it is possible to fix one of the skip amounts RSR and RSL and make only the other variable, to fix one of the delay times TDR and TDL and make only the other variable, or to fix one of the rich integration constant KIR and the lean integration constant KIL and make the other variable.

Further, as the intake air sensor, use may be made of a Karman vortex sensor, a heat wire sensor, etc. instead of the air flow meter.

Further, in the above-mentioned embodiment, the amount of fuel injection was computed in accordance with the amount of intake air and the rotational speed of the engine, but the amount of the fuel injection may also be computed in accordance with the intake air pressure and the engine rotational speed or by the throttle value opening and the engine rotational speed.

Further, in the above-mentioned embodiment, an internal combustion engine was shown which controlled the amount of fuel injection to the intake system by fuel injection valves, but the present invention may also be applied to a carburetor type internal combustion engine as well. For example, the present invention may be applied to one wherein the air-fuel ratio is controlled by adjusting the amount of intake air of the engine by a electronic air control valve (EACV), one wherein the air-fuel ratio is controlled by adjusting the amount of air bleed of the carburetor by an electronic bleed air control valve and introducing the atmosphere into the main passage and the slow passage, one adjusting the amount of secondary air fed into the exhaust system of the engine, etc. In this case, the amount of basic fuel injection corresponding to the basic injection amount TAUP at step 1302 in FIG. 12 is determined by the carburetor itself, that is, is determined by the intake pipe negative pressure and the engine rotational speed in accordance with the amount of intake air. The amount of supplied air corresponding to the final fuel injection amount TAU is computed at step 1303.

Further, in the above-mentioned embodiment, use was made of an $O_2$ sensor as the air-fuel ratio sensor, but use may also be made of a CO sensor, a lean mixture sensor, etc. In particular, if use is made of a $TiO_2$ sensor as the upstream side air-fuel ratio sensor, then it is possible to improve the control response and prevent overcorrection by the output of the downstream side air-fuel ratio sensor.

Further, the above-mentioned embodiment was comprised by a microcomputer, for example, a digital circuit, but may also be comprised of an analog circuit.

According to the present invention, it is possible to rapidly reduce the amount of oxygen absorbed and held at the three-way catalyst since the air-fuel ratio is made the rich side air-fuel ratio when a continuous lean operating state such as a fuel cut or introduction of secondary air ends. As a result, after a continuous lean operating state ends, it is possible to resume feedback control without being affected by the oxygen absorbed and held in the three-way catalyst in a short time, so it is possible to reduce the generation of NOx.

While the invention has been described by reference to specific embodiments chosen for purposes of illustration, it should be apparent that numerous modifications could be made thereto by those skilled in the art without departing from the basic concept and scope of the invention.

I claim:

1. An air-fuel ratio control device of an engine having an exhaust passage which has a three-way catalyst therein, said device comprising:
   air-fuel ratio detecting means arranged in the exhaust pipe to detect an air-fuel ratio;
   calculating means for calculating an amount of correction of air-fuel ratio, which amount is necessary to equalize an air-fuel ratio of mixture fed into the engine to the stoichiometric air-fuel ratio, on the basis of an output of said air-fuel ratio detecting means;
   control means for controlling an amount of fuel fed into the engine on the basis of said amount of correction of air-fuel ratio to equalize the air-fuel ratio of mixture to the stoichiometric air-fuel ratio in a predetermined first engine operating state;
   a first air-fuel ratio adjusting means for stopping the control of the amount of fuel by said control means to maintain the air-fuel ratio of mixture at a lean side air-fuel ratio during a predetermined second engine operating state; and
   a second air-fuel ratio adjusting means for stopping the control of the amount of fuel by said control means to maintain the air-fuel ratio of mixture at a rich side air-fuel ratio during a predetermined time after the engine operating state is changed from said second engine operating state to said first engine operating state.

2. An air-fuel ratio control device as set forth in claim 1, farther comprising deterioration detection means for detecting the degree of deterioration of the three-way catalyst, wherein said second air-fuel ratio adjusting means changes the degree of richness of the said rich side air-fuel ratio in accordance with the degree of deterioration of the three-way catalyst.

3. An air-fuel ratio control device as set forth in claim 2, wherein said second air-fuel ratio adjusting means makes the degree of richness of the said rich side air-fuel ratio smaller the larger the degree of deterioration of the three-way catalyst.

4. An air-fuel ratio control device as set forth in claim 3, wherein said air-fuel ratio correction amount can be reduced in a skipping manner when the air-fuel ratio changes from lean to rich, the said air-fuel ratio correction amount can be increased in a skipping manner when the air-fuel ratio changes from rich to lean, and the said deterioration detection means judges that the degree of deterioration of the three-way catalyst is large the smaller the frequency of occurrence of skip-wise decreases or increases in the said air-fuel ratio correction amount.

5. An air-fuel ratio control device as set forth in claim 4, wherein said deterioration detection means judges the degree of deterioration of the three-way catalyst from the frequency of occurrence of times when the engine load is in a predetermined range and the engine rotational speed is within a predetermined range.

6. An air-fuel ratio control device as set forth in claim 2, wherein memory means is provided for storing the said air-fuel ratio correction amount at the time of a change from said first engine operating state to said second engine operating state and said second air-fuel ratio adjusting means corrects the said air-fuel ratio correction amount to the rich side with respect to the said air-fuel ratio correction amount stored in said memory means by exactly an amount corresponding to the degree of deterioration of the three-way catalyst.

7. An air-fuel ratio control device as set forth in claim 6, wherein said first air-fuel ratio adjusting means sets the air-fuel ratio correction amount stored in the said memory means as the initial value of the air-fuel ratio correction amount when said predetermined time elapses.

8. An air-fuel ratio control device as set forth in claim 1, wherein said predetermined time is a fixed time.

9. An air-fuel ratio control device as set forth in claim 1, wherein said air-fuel ratio detecting means is comprised of an $O_2$ sensor arranged in the exhaust passage downstream of the three-way catalyst.

10. An air-fuel ratio control device as set forth in claim 1, wherein said air-fuel ratio detecting means is comprised of a first $O_2$ sensor arranged in the exhaust passage upstream of the three-way catalyst and a second $O_2$ sensor arranged in the exhaust passage downstream of the three-way catalyst and said calculating means calculates the air-fuel ratio correction amount required for making the air-fuel ratio of the air-fuel mixture supplied to the engine the stoichiometric air-fuel ratio based on the output of the said first $O_2$ sensor and corrects the said air-fuel ratio correction amount based on the output of said second $O_2$ sensor so that the air-fuel ratio of said air-fuel mixture matches the stoichiometric air-fuel ratio accurately.

11. An air-fuel ratio control device as set forth in claim 10, wherein when it is judged based on the output of the said first $O_2$ sensor that the air-fuel ratio has changed from lean to rich, the said air-fuel ratio correction amount is reduced skip-wise, when it is judged based on the output of the said first $O_2$ sensor that the air-fuel ratio has changed from rich to lean, the said air-fuel ratio correction amount is reduced skip-wise, while it is judged based on the output of the second $O_2$ sensor that the air-fuel ratio is lean, the amount of skip-wise increase of the said air-fuel ratio correction amount is gradually increased and the amount of skip-wise decrease of the said air-fuel ratio correction amount is gradually decreased, and while it is judged based on the output of the said second $O_2$ sensor that the air-fuel ratio is rich, the amount of skip-wise increase of the said air-fuel ratio correction amount is gradually decreased and the amount of skip-wise decrease of the said air-fuel ratio correction amount is gradually increased.

12. An air-fuel ratio control device as set forth in claim 10, wherein deterioration detection means is provided for detecting the degree of deterioration of the three-way catalyst and said second air-fuel ratio adjusting means changes the degree of richness of the said rich side air-fuel ratio in accordance with the degree of deterioration of the three-way catalyst.

13. An air-fuel ratio control device as set forth in claim 12, wherein said second air-fuel ratio adjusting means makes the degree of richness of the said rich side air-fuel ratio smaller the larger the degree of deterioration of the three-way catalyst.

14. An air-fuel ratio control device as set forth in claim 13, wherein said first $O_2$ sensor produces an output which changes in accordance with a change in the air-fuel ratio between rich and lean, and said second $O_2$ sensor produces an output which changes in accordance with a change in the air-fuel ratio between rich and lean, and said deterioration detecting means judges that the degree of deterioration of the three way catalyst becomes large as a ratio of a frequency of the change in the output of said second $O_2$ sensor to a frequency of the change in the output of said first $O_2$ sensor becomes large.

15. An air-fuel ratio control device as set forth in claim 14, wherein said deterioration detection means judges the degree of deterioration of the three-way catalyst from said ratio of the frequency when the engine load is in a predetermined range and the engine rotational speed is within a predetermined range.

16. An air-fuel ratio control device as set forth in claim 14, said deterioration detecting means judges the degree of deterioration of the three way catalyst from said ratio of the frequency when the number of the changes in the output of said first $O_2$ sensor exceeds a predetermined number.

17. An air-fuel ratio control device as set forth in claim 12, wherein memory means is provided for storing the said air-fuel ratio correction amount at the time of a change from said first engine operating state to said second engine operating state and said second air-fuel ratio adjusting means corrects the said air-fuel ratio correction amount to the rich side with respect to the said air-fuel ratio correction amount stored in said memory means by exactly an amount corresponding to the degree of deterioration of the three-way catalyst.

18. An air-fuel ratio control device as set forth in claim 17, wherein said first air-fuel ratio adjusting means sets the air-fuel ratio correction amount stored in the said memory means as the initial value of the air-fuel ratio correction amount when said predetermined time elapses.

19. An air-fuel ratio control device as set forth in claim 1, wherein said first air-fuel ratio adjusting means stops the supply of fuel to the engine during the said second engine operating state.

* * * * *